(12) United States Patent
Candelore et al.

(10) Patent No.: US 11,729,476 B2
(45) Date of Patent: Aug. 15, 2023

(54) REPRODUCTION CONTROL OF SCENE DESCRIPTION

(71) Applicant: SONY GROUP CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/170,695

(22) Filed: Feb. 8, 2021

(65) Prior Publication Data

US 2022/0256156 A1 Aug. 11, 2022

(51) Int. Cl.
*H04N 21/84* (2011.01)
*H04N 19/126* (2014.01)
*G06N 20/00* (2019.01)
*H04N 21/43* (2011.01)
*H04N 21/466* (2011.01)
*H04N 21/488* (2011.01)
(Continued)

(52) U.S. Cl.
CPC ............ *H04N 21/84* (2013.01); *G06N 20/00* (2019.01); *H04N 19/126* (2014.11); *H04N 21/43074* (2020.08); *H04N 21/4662* (2013.01); *H04N 21/4882* (2013.01); *H04N 21/6587* (2013.01); *H04N 21/8133* (2013.01); *H04N 21/8456* (2013.01)

(58) Field of Classification Search
CPC ............ H04N 21/84; H04N 21/43074; H04N 21/4662; H04N 21/4882; H04N 21/6587; H04N 21/8133; H04N 21/8456; H04N 19/126; G06N 20/00
See application file for complete search history.

(56) References Cited

U.S. PATENT DOCUMENTS 9,191,639 B2   11/2015   Kuspa
10,999,566 B1 *  5/2021   Mahyar .................. G06V 20/41
(Continued)

OTHER PUBLICATIONS

Campos, et al., "CineAD: A System for Automated Audio Description Script Generation for the Visually Impaired", Universal Access in the Information Society, vol. 19, No. 1, Mar. 2020, pp. 99-111.

*Primary Examiner* — Jefferey F Harold
*Assistant Examiner* — Alexander Boyd
(74) *Attorney, Agent, or Firm* — Chip Law Group

(57) ABSTRACT

A media rendering device and method for reproduction control of scene description is provided. The media rendering device retrieves media content that includes a set of filmed scenes and text information. The text information includes video description information and timing information. The video description information describes a filmed scene in the set of filmed scenes. The media rendering device further extracts the timing information to reproduce the video description information from the text information of the filmed scene. The media rendering device further controls the reproduction of the video description information in either a textual representation or in a textual and audio representation at a first-time interval indicated by the extracted timing information of the filmed scene.

18 Claims, 6 Drawing Sheets

(51) Int. Cl.
*H04N 21/6587* (2011.01)
*H04N 21/81* (2011.01)
*H04N 21/845* (2011.01)

(56) References Cited

U.S. PATENT DOCUMENTS

| | | | |
|---|---|---|---|
| 2008/0162577 A1* | 7/2008 | Fukuda | G06F 16/7844 |
| 2011/0047155 A1* | 2/2011 | Sohn | H04N 19/134 |
| | | | 707/E17.014 |
| 2013/0124984 A1* | 5/2013 | Kuspa | H04N 21/84 |
| | | | 715/255 |
| 2014/0028914 A1* | 1/2014 | Polak | H04N 21/43072 |
| | | | 348/515 |
| 2019/0069045 A1 | 2/2019 | Kahn | |
| 2020/0404386 A1* | 12/2020 | McCartney, Jr. | ............ |
| | | | H04N 21/43074 |
| 2021/0151082 A1* | 5/2021 | Wang | H04N 21/84 |

* cited by examiner

REPRODUCTION CONTROL OF SCENE DESCRIPTION

CROSS-REFERENCE TO RELATED APPLICATIONS/INCORPORATION BY REFERENCE

None.

FIELD

Various embodiments of the disclosure relate to media reproduction control. More specifically, various embodiments of the disclosure relate to a media rendering device and a method for reproduction control of scene description.

BACKGROUND

Recent advancements in the field of media content reproduction have led to development of various techniques to control various portions of media content. Typically, the media content (for example a movie) may include different portions, such as, a video track and a corresponding audio track, that may be rendered simultaneously on a media rendering device for one or more viewers. In certain situations, the viewer, such as a visually impaired or cognitively impaired person, may face problems in understanding the movie as not being able to visualize elements, context, plot or emotions in a scene of the media content. Certain media content may include audio with video descriptions as an alternative audio track in the media content, along with the video track and the audio track, to further enhance the experience of the media content for the visually impaired or cognitively impaired viewer. In certain scenarios, video description is audio-based and is used to describe the video, hence the name "video description". However, it should be noted that in the United States, the Federal Communication Commission (FCC) with the Twenty-First Century Communications and Video Accessibility Act of 2010, FCC 20-155 (2020) issued on Nov. 30, 2020 changed the terminology to "audio description". In this document, we are continuing to use the old terminology "video description". The narrated descriptions enhance accessibility of the media content for the viewer, such as the visually impaired or cognitively impaired person. These video descriptions are inserted into natural pauses between the audio track (for example dialogues) in the pre-recorded media content. In certain scenarios with respect to the inclusion of the video description in the natural pauses, the corresponding video description is either edited to remove one or more relevant portions of the video description, or the duration of the natural pauses is increased, such that the video description may accommodate within the corresponding duration of the natural pause. In such scenarios, the removal of the relevant portions in the video description or enhancement of the duration of the audio track of the media content may be undesirable and may lead to unpleasant and low-quality content experience for the viewer. Moreover, as the video description is inserted into natural pauses in the dialogue of the media content, the cognitively impaired persons often cannot understand very well, as part of the natural aging process, and may not be able to understand the video description. Therefore, there is a need of an enhanced device which may effectively control the video description to provide an improved experience of the media content for the viewer (for example the visual impaired or cognitively impaired person).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A media rendering device and a method for reproduction control of scene description is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
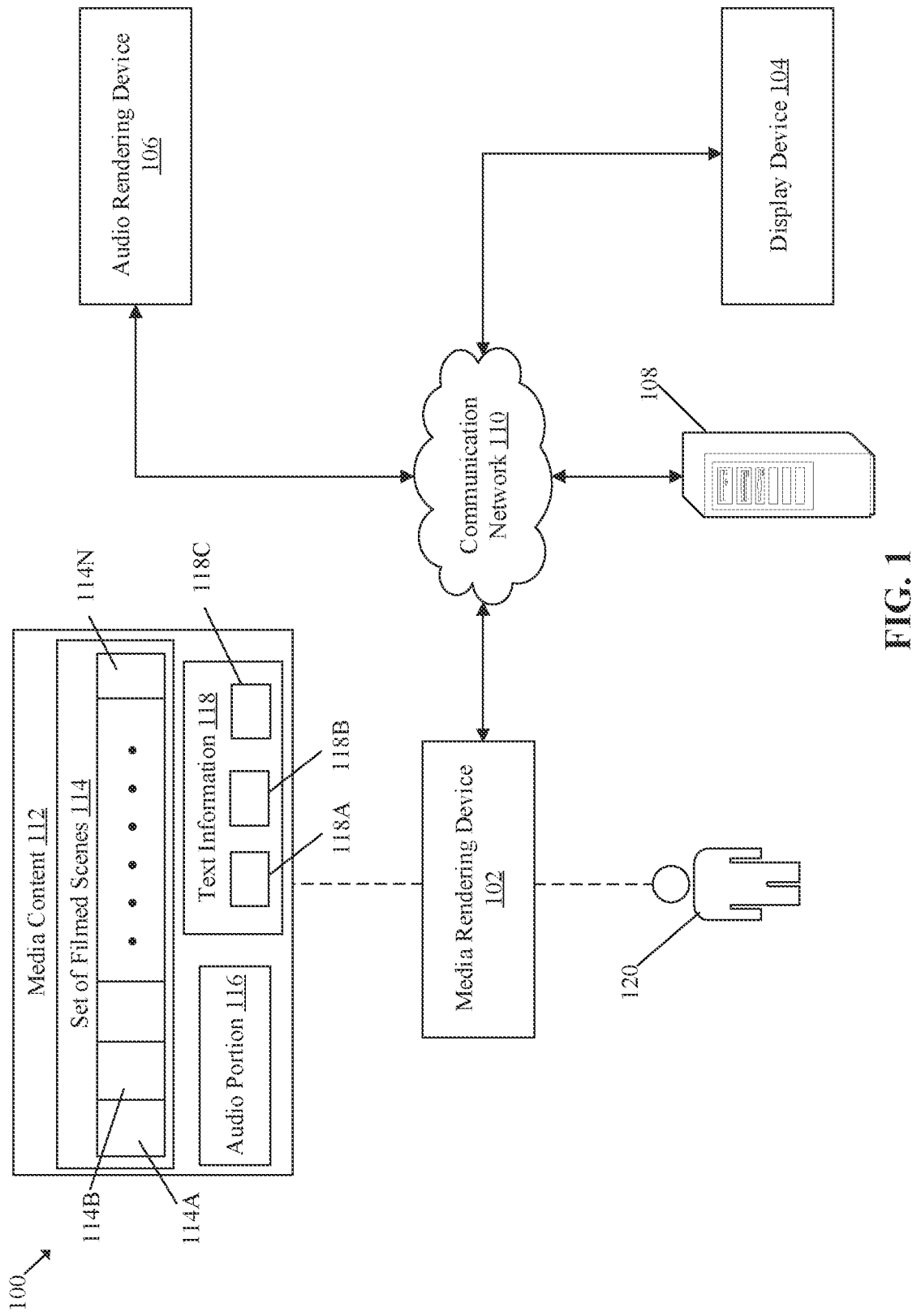
FIG. 1 is a block diagram that illustrates an exemplary network environment for reproduction control of scene description, in accordance with an embodiment of the disclosure.

The following described implementations may be found in the disclosed media rendering device and method for dynamic control of reproduction of a scene description, to enhance media content experience for a viewer (such as a visually impaired or cognitively impaired user). Exemplary aspects of the disclosure provide a media rendering device (for example a television) that may be configured to retrieve media content (for example a movie) that may include a set of filmed scenes. The media content may further include text information that may further include video description information (for example a video, a plot or scene description that may describe a filmed scene in the set of filmed scenes), and timing information to reproduce the video description information. The timing information may include information about gaps or pauses (i.e. gaps in audio portions of the media content) which may accommodate a textual representation or an audio representation, or combination of the video description information. The media rendering device may extract the timing information from the text information of the filmed scene to reproduce the video description information. The media rendering device may be configured to control the reproduction of the video description information in either an audio representation, in a textual representation, or in the textual representation and the audio representation at a first-time interval (i.e. indicated by the extracted timing information of the filmed scene.

In another embodiment, the text information may further include speed information to reproduce the video description information. The speed information may include information about the playback speed for playback of the audio representation of the video description information corresponding to the timing information. The media rendering device may extract the speed information from the text information of the filmed scene to reproduce the audio representation of the video description information. The media rendering device may be configured to control the reproduction of the audio representation of the video description information at the first-time interval (i.e. indicated by the extracted timing information of the filmed scene) based on the extracted speed information.

In another embodiment, the media rendering device that may be configured to retrieve the media content that may include only the set of filmed scenes and the video description information that may describe a filmed scene in the set of filmed scenes but may not include the timing information and the speed information. The media rendering device may be configured to determine a set of second-time intervals of the filmed scene, where each of the set of second-time intervals may indicate a time interval for reproduction of an audio portion (for example a dialogue) in the filmed scene. The media rendering device may be further configured to determine a third-time interval which may correspond to a duration to render the audio representation of the video description information (i.e. scene description) of the filmed scene. The media rendering device may be further configured to determine the first-time interval (i.e. gap or pause) between the set of second-time intervals to include the audio representation of the video description information, and further control a speed of reproduction of the included audio representation of the video description information, based on the determined set of second-time intervals and the determined third-time interval.

In another embodiment, the media rendering device may render the video description information (say in a textual format or representation) directly on a display device associated with the media rendering device 102. The text of the video description information may be overlaid on the retrieved media content or outside the retrieved media content which may be rendered on the display device. In another embodiment, the text of the video description information may be optionally displayed along with closed caption information (i.e. closed captions related to the audio portions or dialogues of the media content). This may be advantageous as the media content may be manually controlled (paused and played) by a user of the media rendering device if the video description information is long and more time may be needed by the user to read the video description information rendered on the display device.

In contrast to conventional solutions where relevant portions of the video/scene description may be removed or the duration of the length of the pause/gap may be increased to include the scene description in the pause/gap of the media content, the disclosed media rendering device may be able to reproduce the audio representation of the video description information (i.e. scene or video description) based on the speed which may be retrieved along with the media content or which may dynamically determined based on the duration of the detected gaps/pauses between the dialogues of the filmed scene. The media rendering device may increase/decrease the playback speed of the audio representation of the video description information based on a duration of the natural pause(s) or gap identified in the filmed scene and a defined speed setting associated with the media rendering device. Thus, an overall quality of reproduction of the scene/video description may not be compromised which may further enhance content experience for the viewer (i.e. visually impaired or cognitively impaired viewer) in real-time basis.

Further, in comparison to conventional solutions where the video or scene description may be received in an audio form, the disclosed media rendering device may be configured to receive or include the scene description in a textual format in the media content, and further convert textual information of the scene description into the audio representation. It should be noted, that optionally, the video description information can be kept as text to be rendered directly on the display device (i.e. either overlaid on the media content or outside the media content if the media content is decimated). Therefore, the inclusion or communication of the scene description in the textual format may save appropriate bandwidth required to transmit the video descriptions in the audio form between two devices. Hence, the disclosed media rendering device may provide efficient utilization of the bandwidth as compared to the conventional solutions which essentially duplicates the audio tracks—one with video description information and one without the video description information. In addition, the textual version of the video descriptions can allow for word searches in order to locate a particular scene in a movie or TV show.

FIG. 1 is a block diagram that illustrates an exemplary network environment for reproduction control of scene description, in accordance with an embodiment of the disclosure. With reference to FIG. 1, there is shown a network environment 100. The network environment 100 may include a media rendering device 102, a display device 104, an audio rendering device 106, a server 108, and a communication network 110. The media rendering device 102 may be communicatively coupled to the display device 104, the audio rendering device 106, the server 108, via the communication network 110. The media rendering device 102 may be configured with an over-the-air terrestrial tuner (not shown) so that, when connected to an antenna, media content 112 may be received. In FIG. 1, the media rendering device 102 and the display device 104 are shown as two separate devices; however, in some embodiments, the entire functionality of the display device 104 may be included in the media rendering device 102, without a deviation from scope of the disclosure.

Further in FIG. 1, although the audio rendering device 106 is shown separated from the media rendering device 102 and/or the display device 104, the disclosure is not so limited. In some embodiments, the audio rendering device 106 may be integrated in the media rendering device 102 and/or the display device 104, without deviation from scope of the disclosure. With reference to FIG. 1, there is further shown media content 112 that may include a set of filmed scenes 114, an audio portion 116, and text information 118. The set of filmed scenes 114 may include a first filmed scene 114A, a second filmed scene 114B, and an $N^{th}$ filmed scene 114N as shown in FIG. 1. Each of the set of filmed scenes 114 may include a plurality of shots that may be assembled to make a corresponding filmed scene. The text information 118 may also include video description information 118A, and timing information 118B. In some embodiments, the text information may also include speed information 118C. The video description information 118A may include description about at least one of the filmed scenes (for example the first filmed scene 114A) in the set of filmed scenes 114. In some embodiments, each of the set of filmed scenes 114, including the plurality of shots, may further include one or more image frames or portions associated with the audio portion 116. There is further a shown a user 120 which may be associated with the media rendering device 102. For example, the user 120 may a viewer of the media content 112 and may be a visually impaired or a cognitively impaired viewer.

The media rendering device 102 may comprise suitable logic, circuitry, interfaces, and or code that may be configured to retrieve the media content 112 from a remote source (such as the server 108) or from memory (i.e. memory 204 in FIG. 2) of the media rendering device 102. In some embodiments, the media content 112 may be retrieved over-the-air with the help of a terrestrial tuner. In certain scenarios, the media content 112 may be received digitally using the Advanced Television Systems Committee (ATSC) or ATSC 3.0 standard.

The media content 112 may include the text information 118 that may further include the video description information 118A, the timing information 118B, and the speed information 118C. The video description information 118A may describe the filmed scene (such as the first filmed scene 114A) of the set of filmed scenes 114. The media rendering device 102 may be configured to extract the timing information 118B from the text information 118 of the first filmed scene 114A. The timing information 118B may be used by the media rendering device 102 to reproduce the video description information. In some embodiments, the media rendering device may also use the speed information 118C with the timing information 118B to reproduce the video description information. The media rendering device 102 may be further configured to control the reproduction of the video description information either in a textual representation, an audio representation, or both in the textual representation and the audio representation, at a first-time interval indicated by the extracted timing information of the filmed scene. In some other embodiments, the media rendering device 102 may be further configured to control the reproduction of the audio representation of the video description information at the first-time interval indicated by the extracted timing information of the filmed scene based on the extracted speed information 118C.

In another embodiment, the media rendering device 102 may retrieve the media content 112 from a remote source (such as the server 108) or from memory (i.e. memory 204 in FIG. 2) of the media rendering device 102. The media content may include the video description information 118A that may describe the filmed scene (such as the first filmed scene 114A) of the set of filmed scenes 114. The media rendering device 102 may be configured to determine a set of second-time intervals for reproduction of the audio portion 116 of the first filmed scene 114A, and determine a third-time interval to reproduce an audio representation of the video description information 118A. The media rendering device 102 may be further configured to determine a speed to reproduce the audio representation of the video description information 118A based on the determined set of second-time intervals and the third-time interval. Examples of the media rendering device 102 may include, but are not limited to, a digital media player (DMP), a Smart Television media player, an over-the-top (OTT) player, a digital media streamer, a media extender/regulator, a digital media hub, a media content controller, a television, a computer workstation, a mainframe computer, a handheld computer, a mobile phone, a smart phone, a cellular phone, a smart appliance, a personal digital assistance (PDA), a smart speaker, a smart glass, a sound system, a head mounted device (HMD), a head-set, a smart headphone, and/or other computing device with audio-video rendering capability.

The display device 104 may include suitable logic, circuitry, and interfaces that may be configured to display the set of filmed scenes 114 present in the retrieved media content 112. The display device 104 may be further configured to display the video description information 118A in a textual format. The display device 104 may be a touch screen which may enable a user to provide a user-input via the display device 104. The touch screen may be at least one of a resistive touch screen, a capacitive touch screen, or a thermal touch screen. The display device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 104 may refer to a display screen of a head mounted device (HMD), a smart-glass device, a see-through display, a projection-based display, an electro-chromic display, or a transparent display.

The audio rendering device 106 may include suitable logic, circuitry, and interfaces that may be configured to reproduce or playback the audio representation of the video description information 118A (i.e. scene or video description). The audio rendering device 106 may be further configured to reproduce the audio portion 116 (for example dialogues) of the first filmed scene 114A or the set of filmed scenes 114. Examples of the audio rendering device 106 may include, but are not limited to, a loudspeaker, an-wall/ceiling speakers, a soundbar, a woofer or a sub-woofer, a soundcard, a headphone, a headset, a wireless speaker, and/or other computing device with audio reproduction capabilities.

The server 108 may comprise suitable logic, circuitry, interfaces, and code that may be configured to store the media content 112. The server 108 may receive a request from the media rendering device 102 to retrieve the media content 112 stored in the server 108. In some embodiments, the server 108 may be configured to store a defined speed setting that may indicate a maximum speed to reproduce the audio representation of the video description information 118A (i.e. scene description). The server 108 may be implemented as a cloud server which may execute operations through web applications, cloud applications, HTTP requests, repository operations, file transfer, and the like. Other examples of the server 108 may include, but are not limited to a database server, a file server, a web server, a media server, an application server, a mainframe server, a cloud server, or other types of servers. In one or more embodiments, the server 108 may be implemented as a plurality of distributed cloud-based resources by use of several technologies that are well known to those skilled in the art. A person with ordinary skill in the art will understand that the scope of the disclosure may not be limited to implementation of the server 108 and the media rendering device 102 as separate entities. In certain embodiments, the functionalities of the server 108 may be incorporated in its entirety or at least partially in the media rendering device 102, without departure from the scope of the disclosure.

The communication network 110 may include a communication medium through which the media rendering device 102, the display device 104, the audio rendering device 106, and the server 108 may communicate with each other. The communication network 110 may be a wired or wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the disclosed media rendering device 102 may receive a request from the user 120 to reproduce media content 112. Examples of the media content 112 may include, but are not limited to, a video clip, a movie, an advertisement, an audio-video content, a gaming content, or a slide show clip. Based on the request, the media rendering device 102 may retrieve the media content 112 from the remote source (such as the server 108) or from the memory (such as the memory 204 of FIG. 2) of the media rendering device 102. The media content 112 may include the set of filmed scenes 114, the audio portion 116, and the text information 118. The text information 118 may include the video description information 118A that may describe the filmed scene (for example the first filmed scene 114A) of the set of filmed scenes 114 and may be in a textual format. In some embodiments, the video description information 118A may describe each of the set of filmed scenes 114 present in the media content 112. In an embodiment, the media rendering device 102 may be further configured to convert the video description information 118A (for example, in textual form) of the first filmed scene 114A into an audio representation of the video description information 118A. The text information 118 may also include the timing information 118B. The timing information 118B may indicate a first time-interval where the audio representation of the video description information 118A may be accommodated and reproduced. In another embodiment, the text information 118 may further include the speed information 118C. The speed information 118C may indicate a playback speed for the reproduction of the audio representation of the video description information 118A during a particular time-interval (such as the first-time interval) indicated by the timing information 118B. The media rendering device 102 may be further configured to extract the timing information 118B from the text information 118 of the first filmed scene 114A. The media rendering device 102 may be further configured to control the reproduction of the video description information 118A either in the textual representation, in the audio representation, or in the textual representation and the audio representation at the first-time interval indicated by the extracted timing information 118B of the first filmed scene 114A of the set of filmed scenes 114. In some other embodiments, the media rendering device 102 may be further configured to extract the speed information 118C. In such case, the media rendering device 102 may be further configured to control the reproduction of the audio representation of the video description information 118A at the first-time interval indicated by the extracted timing information 118B of the first filmed scene 114A of the set of filmed scenes 114 based on the extracted speed information 118C.

In another embodiment, the media rendering device 102 may determine the set of second-time intervals of the first filmed scene 114A, where each of the set of second-time intervals may indicate a time interval for reproduction of the audio portion 116 (i.e. dialogues) of the first filmed scene 114A in the set of filmed scenes 114. The media rendering device 102 may be further configured to determine the third-time interval required to reproduce the audio representation of the video description information 118A of the first filmed scene 114A. The third-time interval may correspond to a time taken or a duration required to reproduce the audio representation of the video description information 118A of the first filmed scene 114A. The details of the set of second-time intervals and the third-time interval are described, for example, in FIG. 4.

The media rendering device 102 may be further configured to determine a speed to reproduce the audio representation of the video description information 118A. The determined speed may be a rate at which the audio representation of the video description information 118A may be reproduced for the user 120, for example, during the playback of the first filmed scene 114A. The speed to reproduce the audio representation of the video description information 118A may be determined based on the determined set of second-time intervals and the determined third-time interval. In some embodiments, the determined speed may be lower than an actual playback speed of the audio representation of the video description information 118A. In some other embodiments, the determined speed may be higher than the actual playback speed of the audio representation of the video description information 118A. The details of determination of the speed to reproduce the audio representation of the video description information 118A based on the determined set of second-time intervals and the determined third-time interval are described, for example, in FIG. 4.

The media rendering device 102 may be further configured to control the reproduction of the audio representation of the video description information 118A based on the determined speed. The audio representation of the video description information 118A may be reproduced at the first-time interval (for example gaps between dialogues of the first filmed scene 114A). The first-time interval may be different than the set of second-time intervals. In some embodiments, the first-time interval may be an interval (i.e. gap) between a first dialogue word and a second dialogue word of the first filmed scene 114A. The first dialogue word may correspond to a last word of a shot (for example a first shot) of the first filmed scene 114A, and the second dialogue word may correspond to a first word of a next shot (for example a second shot) of the first filmed scene 114A. The first shot and the second shot may be consecutive shots of the first filmed scene 114A. In another embodiment, the first-time interval may be an interval (i.e. gap) between a start of the first filmed scene 114A and a first dialogue word of the first filmed scene 114A. In an embodiment, the media rendering device 102 may determine the speed to reproduce the audio representation of the video description information 118A to be higher than the actual playback speed of the audio representation of the video description information 118A, in case the first-time interval (i.e. gap) may be less than the third-time interval. In another embodiment, the media rendering device 102 may determine the speed to reproduce the audio representation of the video description information 118A to be lower than the actual playback speed of the audio representation, in case the first-time interval (i.e.

gap) may be higher than the third-time interval. The increase or decrease in the speed of reproduction of the audio representation of the video description information 118A (i.e. description of the first filmed scene 114A) may reproduce scene description without any significant modification (like reduction in content of the description) and may further maintain quality of the scene/video description for the user 120, such as the visually impaired or cognitively impaired viewer.

Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may include the media rendering device 102 but not the display device 104. In addition, in some embodiments, the functionality of each of the audio rendering device 106 may be incorporated into the display device 104, without deviation from the scope of the disclosure.

Figure 2:
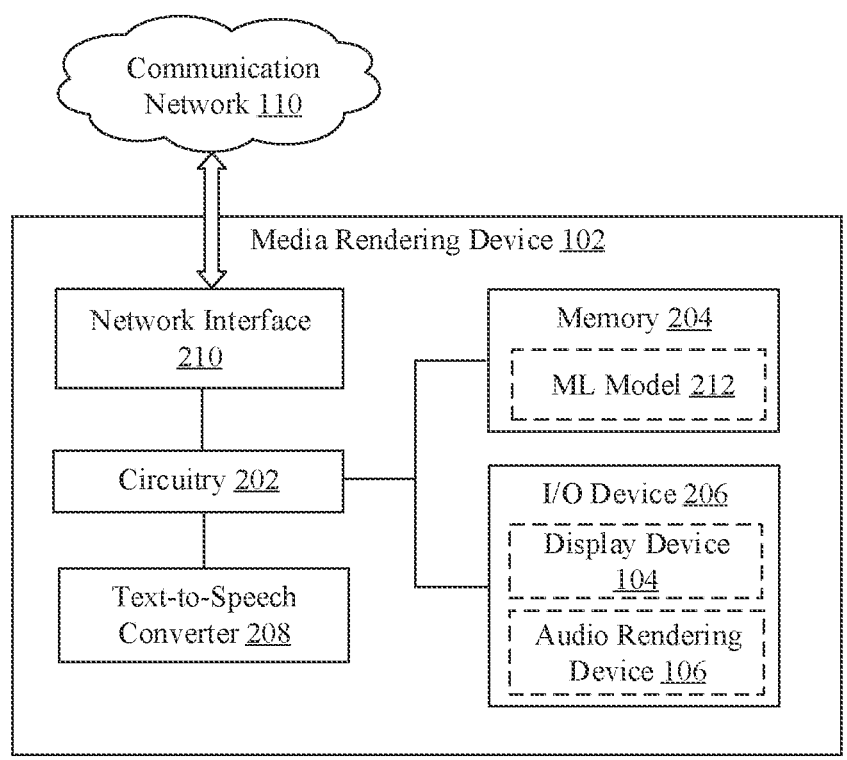
FIG. 2 is a block diagram that illustrates an exemplary media rendering device for reproduction control of scene description, in accordance with an embodiment of the disclosure.

FIG. 2 is a block diagram that illustrates an exemplary media rendering device for reproduction control of scene description, in accordance with an embodiment of the disclosure. FIG. 2 is explained in conjunction with elements from FIG. 1. With reference to FIG. 2, there is shown a block diagram 200 of the media rendering device 102. The media rendering device 102 may include circuitry 202 which may perform operations to control reproduction of scene or video description. The media rendering device 102 may further include a memory 204, an input/output (I/O) device 206, a text-to-speech converter 208, a network interface 210, the display device 104, and the audio rendering device 106. The memory 204 may include a machine learning (ML) model 212. The circuitry 202 may be communicatively coupled to the memory 204, the I/O device 206, the text-to-speech converter 208, the network interface 210, the display device 104, and the audio rendering device 106.

The circuitry 202 may include suitable logic, circuitry, and interfaces that may be configured to execute program instructions associated with different operations to be executed by the media rendering device 102. For example, some of the operations may include retrieval of the media content 112, extraction of the timing information 118B and/or the speed information 118C, and reproduction of the textual representation or the audio representation or the textual representation and the audio representation of the video description information 118A at the first-time interval based on the extracted timing information 118B and the speed information 118C. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the instructions to be executed by the circuitry 202. The memory 204 may be configured to store the media content 112, text information 118, and a defined speed setting which may indicate a maximum speed to reproduce the audio representation of the video description information 118A. The memory 204 may be further configured to store the trained machine learning (ML) model 212 that may be configured to determine audio characteristics based on context information of the filmed scene (such as the first filmed scene 114A). The detailed functionality of the ML model 212 is described, for example, in FIG. 4. The memory 204 may be further configured to store profile information of a user. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 may be configured to receive a first user input corresponding to description of a filmed scene. The I/O device may be further configured to control the playback of the media content 112 via the display device 104 and the audio rendering device 106. The I/O device 206 which may include various input and output devices, which may be configured to communicate with the circuitry 202. Examples of the I/O device 206 may include, but are not limited to, the display device 104, the audio rendering device 106, a touch screen, a keyboard, a mouse, a joystick, and a microphone.

The text-to-speech converter 208 may include suitable logic, circuitry, interfaces, and/or code that may be configured to convert the video description information 118A that describes at least the first filmed scene 114A of the set of filmed scenes 114, into an audio format that may be compatible to be reproduced by the audio rendering device 106. The converted audio may be referred herein as the audio representation of the video description information 118A and may be rendered on the audio rendering device 106. The text-to-speech converter 208 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, and other processors.

The network interface 210 may include suitable logic, circuitry, and interfaces that may be configured to facilitate communication between the circuitry 202 and the server 108, via the communication network 110. The network interface 210 may be implemented by use of various known technologies to support wired or wireless communication of the media rendering device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Figure 3A:
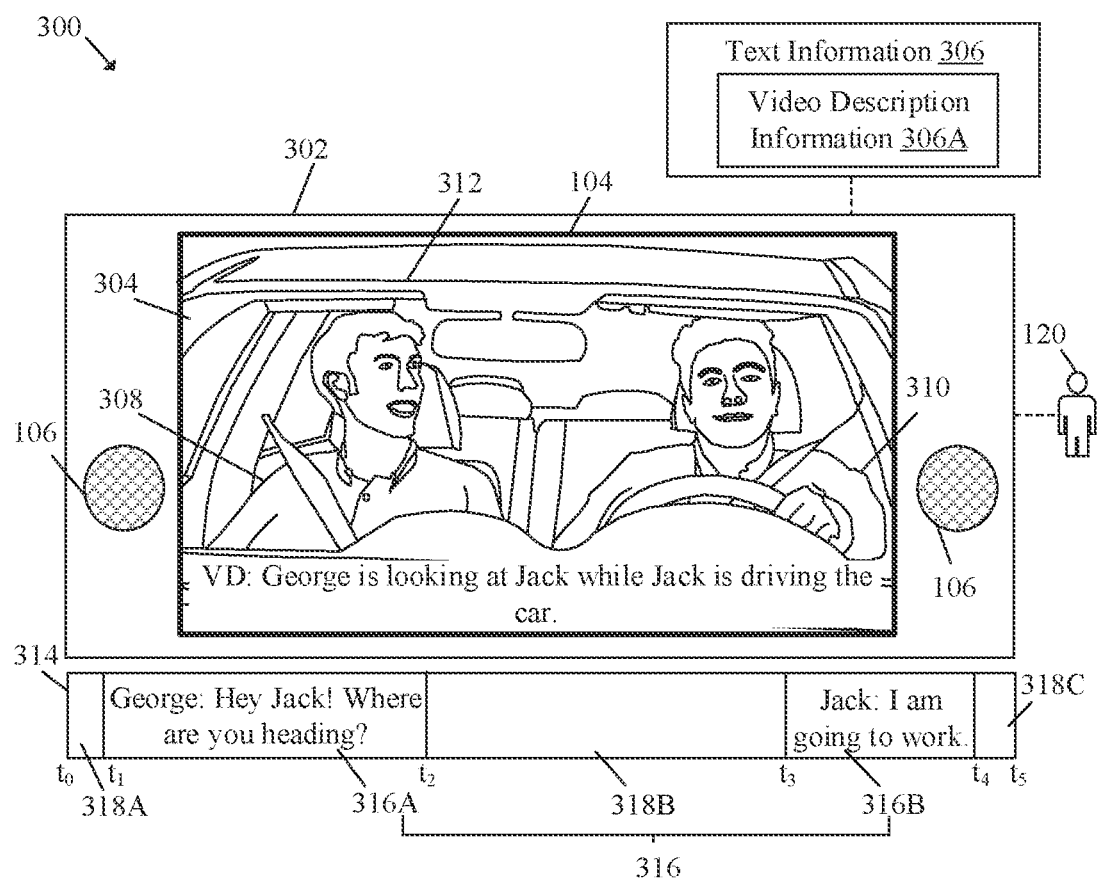
FIGS. 3A-3B are diagrams that collectively illustrate an exemplary scenario for reproduction control of scene description, in accordance with an embodiment of the disclosure.

FIG. 3A is a diagram that illustrates an exemplary scenario for reproduction control of scene description, in accordance with an embodiment of the disclosure. FIG. 3A is explained in conjunction with elements from FIG. 1 and FIG. 2. With reference to FIG. 3A, there is shown an exemplary scenario 300. In the exemplary scenario 300, there is shown a media rendering device 302 (i.e. similar to the media rendering device 102). With reference to FIG. 3A, there is further shown the display device 104 and the audio rendering device 106 associated with the media rendering device 302. The media rendering device 302 may control the display device 104 and the audio rendering device 106 to render media content. Examples of the media content may include, but are not limited to, a video clip, a movie, an audio-video content, a gaming content, an advertisement, or a slide show clip. The media content may include a set of filmed scenes (such as the set of filmed scenes 114 in FIG. 1) which may include a filmed scene 304 displayed on the display device 104 (as shown in FIG. 3A).

It may be noted that the filmed scene 304 shown in FIG. 3A is presented merely as an example of a car scene. The present disclosure may be also applicable to other types of filmed scenes (such as, but not limited to, an action scene, a drama scene, a romantic scene, an emotional scene, a dance scene, a musical scene, a horror scene, or a love scene). A description of other types of filmed scenes has been omitted from the disclosure for the sake of brevity. It may be further noted that the display device 104 shown in FIG. 3A is presented merely as an example of television. The present disclosure may be also applicable to other types of display devices as described, for example, in FIG. 1. A description of other types of such display devices has been omitted from the disclosure for the sake of brevity. It may be further noted that the audio rendering device 106 shown in FIG. 3A is presented merely as an example of speaker. The present disclosure may be also applicable to other types of audio rendering devices as described, for example, in FIG. 1. A description of other types of such audio rendering devices has been omitted from the disclosure for the sake of brevity.

In an embodiment, each of the set of filmed scenes of the media content may include an audio portion, an image portion, and text information 306. The audio portion may include one or more dialogues of each of the set of filmed scenes of the media content in an audio format that may be rendered via the audio rendering device 106. The image portion in each scene may include one or more image frames that may be rendered on the display device 104.

The text information 306 may further include video description information 306A, timing information, and/or speed information. The video description information 306A may describe the filmed scene (such as the filmed scene 304 or the first filmed scene 114A) of the set of filmed scenes, where the filmed scene 304 may be displayed on the display device 104. In some embodiments, the video description information 306A may describe each filmed scene of the set of filmed scenes. Examples of the video description information 306A or the description of the filmed scene may include, but are not limited to, description of one or more of a decor in the filmed scene, description of lighting conditions in the scene, description of a location of the filmed scene, description of a camera motion within the filmed scene, description of background information of the filmed scene, description of an environmental condition of the filmed scene, description of a transition between shots within the filmed scene, description of a text included in the filmed scene, description of characters portrayed in the filmed scene, description of an attitude/emotion of a character portrayed in the filmed scene, description of a spatial relationships between the characters portrayed in the filmed scene, description of physical attributes of the character portrayed in the filmed scene, description of a corporeal expressions of the character portrayed in the filmed scene, description of facial expressions of the character portrayed in the filmed scene, description of a movement of the character portrayed in the filmed scene, description of an occupation or roles of the character portrayed in the filmed scene, and description of a clothing of the character portrayed in the filmed scene.

In accordance with an embodiment, the circuitry 202 may be configured to retrieve the media content that includes the set of filmed scenes and the text information 306 from the memory 204 of the media rendering device 302. In some embodiments, the circuitry 202 may be configured to transmit the request for the media content to the server 108. Based on the transmitted request, the media content (that may contain the set of filmed scenes and the text information 306) may be received from the server 108. The video description information 306A present in the text information 306 may be received in a textual format (rather than in an audio format) which may further save the bandwidth during the communication of the text information 306 between the server 108 and the media rendering device 302. The text information 306 in the textual format may further save storage space in the memory 204 or the server 108. In an embodiment, each of the set of filmed scenes and the text information 306 may be retrieved from the media content before the playback of the media content. In some other embodiments, at the time of playback a particular filmed scene (for example current filmed scene), the circuitry 202 may retrieve the text information 306 of a next filmed scene for further processing (for example extraction of the timing information and speed information or calculation of speed to reproduce audio reproduction of the video description information 306A of the next filmed scene).

In an embodiment, the filmed scene 304 may include a plurality of shots such as a first shot and a second shot. The filmed scene 304 may contain a plurality of animated and in-animated objects. For example, in FIG. 3A, the animated objects may include, but not limited to, a first person 308 (for example with name as "George") and a second person 310 (for example with name as "Jack"). The in-animated objects shown in FIG. 3A may include, but not limited to, a car 312. In FIG. 3A, there is further shown a timeline 314. The timeline 314 may indicate a time interval (for example, in seconds, minutes or hours) for which the filmed scene 304 may be reproduced. A total time indicated in the timeline 314 may be a reproduction time to render all the image frames and/or audio frames associated with the filmed scene 304.

As shown in FIG. 3A, the filmed scene 304 may include the first audio portion 316A and the second audio portion 316B, as an audio portion 316 of the filmed scene 304. Each of the first audio portion 316A and the second audio portion 316B may include dialogues words (such as "George: Hey Jack! Where are you heading" and "Jack: I am going to work" shown in FIG. 3A) corresponding to the first person 308 and/or the second person 310 captured in the filmed scene 304. By the way of an example, as shown in FIG. 3A, in the timeline 314 associated with the filmed scene 304, from the time $t_0$ to $t_1$, there may be a natural pause which may correspond to the first pause 318A. Between the time $t_1$ to $t_2$, the first person 308 may speak "Hey Jack! Where are you heading?" as the dialogue or the first audio portion 316A. Further from time $t_2$ to $t_3$, there may be another natural pause that may correspond to the second pause 318B. At time $t_3$ to $t_4$, the second person 310 may respond to the first person 308 with a dialogue, for example "I am going to work" as the dialogue or the second audio portion 316B. From time $t_4$ to $t_5$, there may be another natural pause which may correspond to the third pause 318C.

By the way of example, the retrieved text information 306 that may include the video description information 306A, and the timing information is presented in the Table 1 as follows:

TABLE 1

| | Text Information | |
|---|---|---|
| S. No | Video Description | Time Interval |
| 1. | George is looking at Jack while Jack is driving the car | $t_2$ to $t_3$ |
| 2. | Video Description 1 | $t_A$ to $t_B$ |
| 3. | Video Description 2 | $t_C$ to $t_D$ |

It may be noted that the number of rows in the text information 306 is merely presented as an example. The text information 306 may include more or less number of rows based on number of video descriptions included in the filmed scene 304.

The circuitry 202 may be further configured to extract the timing information from the text information 306 of the filmed scene 304. The timing information may be extracted to reproduce the video description information 306A of the text information 306. The timing information may indicate a first time-interval (for example the time-interval $t_2$ to $t_3$ as the second pause 318B) in the timeline 314, where the textual representation or the audio representation or both the textual representation and the audio representation of the video description information 306A may be accommodated to be reproduced.

In another embodiment, the circuitry 202 may be further configured to extract the speed information from the text information 306 of the filmed scene 304. Similar to the timing information, the speed information may be extracted to reproduce the video description information 306A of the text information 306. The speed information may indicate a playback speed for the reproduction of the audio representation of the video description information 306A during the first time-interval (i.e. the second pause 318B) indicated by the timing information 118B. By the way of example, the retrieved text information 306 that may include the video description information 306A, the timing information, and the speed information is presented in the Table 2 as follows:

TABLE 2

| | Text Information | | |
|---|---|---|---|
| S. No | Video Description | Time Interval | Reproduction Speed |
| 1. | George is looking at Jack while Jack is driving the car | $t_2$ to $t_3$ | 1.6× |
| 2. | Video Description 1 | $t_A$ to $t_B$ | 0.5× |
| 3. | Video Description 2 | $t_C$ to $t_D$ | 2.0× |

It may be noted that the number of rows in the text information 306 is merely presented as an example. The text information 306 may include more or less number of rows based on number of video descriptions included in the filmed scene 304.

In case of the textual representation, the circuitry 202 may be configured to render the video description information 306A (present in the text information 306) on the display device 104 at the first-time interval (i.e. the second pause 318B) indicated by the extracted timing information of the filmed scene 304. The details about the textual reproduction of the video description information 306A are provided, for example, in FIG. 3B.

In case of the audio representation, the circuitry 202 may be further configured to control the text-to-speech converter 208 to convert the retrieved video description information 306A present in the text information 306 of the filmed scene 304 into the audio representation of the video description information 306A. The circuitry 202 may control the reproduction of the audio representation of the video description information 306A at the first-time interval (i.e. the second pause 318B) indicated by the extracted timing information of the filmed scene 304. The reproduction of the audio representation of the video description information 306A may be based on the extracted speed information.

In case of both the textual representation and the audio representation, the video description information 306A may also be rendered (for example in textual form) on the display device 104 during the first-time interval (i.e. $t_2$ to $t_3$) when the audio representation of the video description information 306A may be rendered via the audio rendering device 106. In accordance with the Table 2, the circuitry 202 may control the reproduction of the audio representation of the video description information 306A (for example "George is looking at Jack while Jack is driving the car") during the first-time interval (i.e. $t_2$ to $t_3$) at the speed of 1.6× of the actual playback speed of the audio representation of the video description information 306A of the filmed scene 304. The actual playback speed may correspond to a rate or speed (i.e. 1× speed) at which an audio of the media content may be rendered. The actual playback speed may a rate or speed at which the audio portion 116 was recorded at the time of capture of the filmed scene 404. The first-time interval (i.e. $t_2$ to $t_3$ shown in FIG. 3A) to reproduce the audio representation of the video description information 306A may be indicated by the timing information included in the text information 306, and the speed (i.e. 1.6×) at which audio representation of the video description information 306A may be reproduced may be indicated by the speed information included in the text information 306.

By way of example and not limitation, in accordance with the Table 1, the circuitry 202 may control the reproduction of the textual representation or both the textual and the audio representation of the video description information 306A ("Video Description 1") during the time interval $t_A$ to $t_B$. By way of another example and not limitation, in accordance with the Table 1, the circuitry 202 may control the reproduction of the audio representation of the video description information 306A ("Video Description 1") during the time interval $t_A$ to $t_B$ with the speed of 0.5× of the actual playback speed of the audio representation of the video description information 306A of the filmed scene 304. Therefore, the disclosed media rendering device 302 may allow to control the timing and/or the speed of the reproduction of the video description information 306A (either in textual representation, in the audio representation or in both the textual representation and the audio representation), based on the timing information and/or the speed information included (say in textual form) in the text information 306 of the media content that may be reproduced via the display device 104 and the audio rendering device 106.

In an embodiment, the circuitry 202 may be configured to display a set of options to the user 120 on the display device 104 before or during rendering of the media content. A first option of the set of options may correspond to selection of the audio representation of the video description information (i.e. the video description information to be rendered in the audio format). A second option of the set of options may correspond to the selection of the textual representation of the video description information (i.e. the video description information to be rendered in the textual format). Similarly, a third option of the set of options may correspond to selection of the audio representation as well as the textual representation of the video description information (i.e. the video description information to be rendered in the both audio representation and textual representation simultaneously). In some embodiments, the circuitry 202 may determine a user preference for the reproduction of the video description information from a user profile of the user 120. The circuitry 202 may further control the reproduction of the video description information (either in textual format, audio format or both) based on the user preference.

Figure 3B:
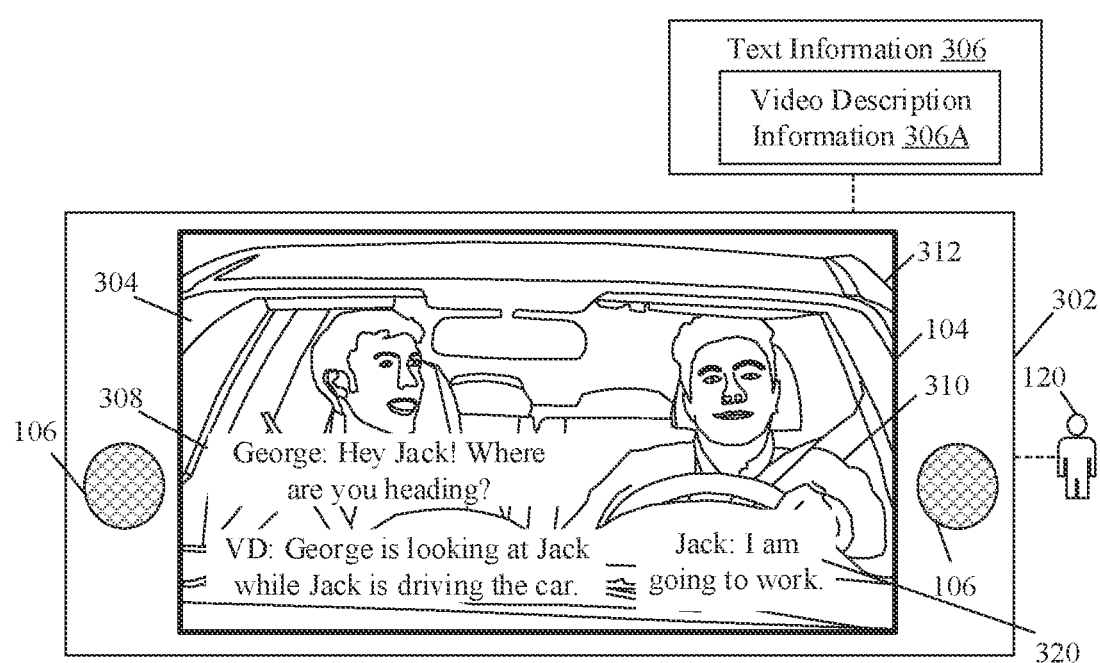

With reference to FIG. 3B, there is shown the media rendering device 302 that may further include the display device 104 and the audio rendering device 106. The media rendering device 302 may control the display device 104 and the audio rendering device 106 to render the media content. The media content may include a set of filmed scenes (such as the set of filmed scenes 114 in FIG. 1) which may include the filmed scene 304 displayed on the display device 104 (as shown in FIG. 3A).

In an embodiment, each of the set of filmed scenes of the media content may include the audio portion, the image portion, the text information 306, and closed caption information 320. The audio portion may include one or more dialogues of each of the set of filmed scenes of the media content in an audio format that may be rendered via the audio rendering device 106. The image portion in each scene may include one or more image frames that may be rendered on the display device 104. The closed caption information 320 may represent the audio portion 116 of the filmed scene 304 in a textual format that may be rendered on the display device 104 (as shown in FIG. 3B) during the playback of the filmed scene 304. The closed caption information 320 may be considered as a transcript of the audio portion of the filmed scene 304. In some embodiments, the video description information 306A (i.e. scene description) may be encoded with the closed caption information 320 in the media content.

In an embodiment, the filmed scene 304 may include a plurality of shots such as a first shot and a second shot. The filmed scene 304 may contain a plurality of animated and in-animated objects. For example, in FIG. 3B, the animated objects may include, but not limited to, the first person 308 (for example with name as "George") and the second person 310 (for example with name as "Jack"). The in-animated objects shown in FIG. 3B may include, but not limited to, the car 312.

In an embodiment, as shown in FIG. 3B, the video description information 306A "George is looking at Jack while Jack is driving the car" during the first-time interval ("$t_2$ to $t_3$") may be rendered, in the textual format, on the display device 104 during the first-time interval (i.e. $t_2$ to $t_3$ shown in FIG. 3A). In another embodiment and in accordance with the Table 2, the circuitry 202 may control the reproduction of the audio representation of the video description information 306A "George is looking at Jack while Jack is driving the car" during the first-time interval ("$t_2$ to $t_3$") with the speed of 1.6× of the actual playback speed (i.e. 1.0× speed) of the audio representation of the video description information 306A of the filmed scene 304. In an embodiment, as shown in FIG. 3B, the video description information 306A may also be rendered, in the textual format, on the display device 104 during the first-time interval (i.e. $t_2$ to $t_3$ shown in FIG. 3A) along with display of the closed caption information 320, while the audio representation of the video description information 306A may be rendered via the audio rendering device 106. The video description information 306A and the closed caption information 320 may be rendered on the display device 104 in the textual format that may be overlaid on the image portion (such as image frames) at the time of display of the filmed scene 304, as shown in FIG. 3B. In some embodiments, the video description information 306A and the closed caption information 320 may be simultaneously rendered on the display device 104 during the first-time interval ($t_2$ to $t_3$) in lieu of the reproduction of the audio representation of the video description information 306A.

Figure 4:
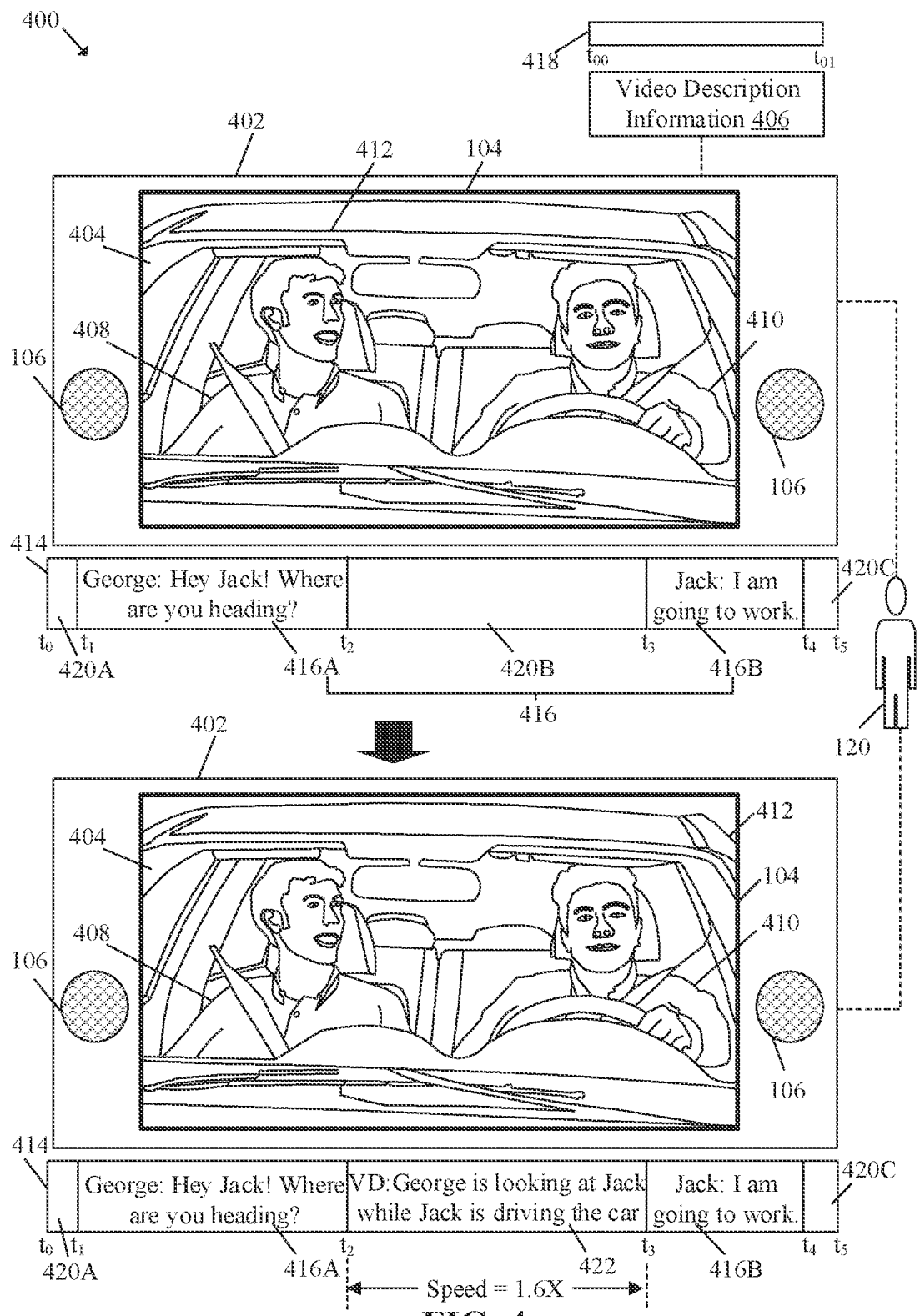
FIG. 4 is a diagram that illustrates another exemplary scenario for reproduction control of scene description, in accordance with an embodiment of the disclosure.

FIG. 4 is a diagram that illustrates another exemplary scenario for reproduction control of scene description, in accordance with an embodiment of the disclosure. FIG. 4 is explained in conjunction with elements from FIG. 1, FIG. 2, FIG. 3A and FIG. 3B. With reference to FIG. 4, there is shown an exemplary scenario 400. In the exemplary scenario 400, there is shown a media rendering device 402 (i.e. similar to the media rendering device 102). With reference to FIG. 4, there is further shown the display device 104 and the audio rendering device 106 associated with the media rendering device 402. The media rendering device 402 may control the display device 104 and the audio rendering device 106 to render the media content. The media content may include a set of filmed scenes (such as the set of filmed scenes 114 in FIG. 1) which may include a filmed scene 404 displayed on the display device 104.

In an embodiment, each of the set of filmed scenes of the media content may include an audio portion, an image portion, and video description information 406. In some embodiments, each of the set of filmed scenes may include text information (such as the text information 306 which may further include the video description information 406 as described, for example, in FIG. 3A). The audio portion may include one or more dialogues of each of the set of filmed scenes of the media content in an audio format that may be rendered via the audio rendering device 106. The image portion in each scene may include one or more image frames that may be rendered on the display device 104. The video description information 406 may describe the filmed scene (such as the filmed scene 404 or the first filmed scene 114A) of the set of filmed scenes, where the filmed scene 404 may be displayed on the display device 104. In some embodiments, the video description information 406 may describe each filmed scene of the set of filmed scenes.

In accordance with an embodiment, the circuitry 202 may be configured to retrieve the media content (that may include the set of filmed scenes and the video description information 406) from the memory 204 of the media rendering device 402. In some embodiments, the circuitry 202 may be configured to transmit the request for the media content to the server 108. Based on the transmitted request, the media content (that may contain the set of filmed scenes and the video description information 406) may be received from the server 108. The video description information 406 may be received in a textual format (rather than in an audio format) which may further save the bandwidth during the communication of the video description information 406 between the server 108 and the media rendering device 402. The video description information 406 in the textual format may further save storage space in the memory 204 or the server 108. In an embodiment, each of the set of filmed scenes and the video description information 406 may be retrieved from the media content before the playback of the media content. In some other embodiments, at the time of playback a particular filmed scene (for example current filmed scene), the circuitry 202 may retrieve the video description information 406 of a next filmed scene for further processing (for example calculation of speed to reproduce audio reproduction of the video description information 406 of the next filmed scene).

The circuitry 202 may be further configured to control the text-to-speech converter 208 to convert the retrieved video description information 406 of the filmed scene 404 into the audio representation of the video description information 406. In some embodiments, information about the filmed scene 404 also include closed caption information. The closed caption information may represent the audio portion 116 of the filmed scene 404 in a textual format that may be overlaid on the image portion (such as image frames) at the time of display of the filmed scene 404 as described, for example, in FIG. 3B. In some embodiments, the video description information 406 (i.e. scene description) may be encoded with the closed caption information in the media content.

In an embodiment, the filmed scene 404 may include a plurality of shots such as a first shot and a second shot. The filmed scene 404 may contain a plurality of animated and in-animated objects. For example, in FIG. 4, the animated objects may include, but not limited to, a first person 408 (for example with name as "George") and a second person 410 (for example with name as "Jack"). The in-animated objects shown in FIG. 4 may include, but not limited to, a car 412. In FIG. 4, there is further shown a timeline 414. The timeline 414 may indicate a time interval (for example, in seconds, minutes or hours) for which the filmed scene 404 may be reproduced. A total time indicated in the timeline 414 may be a reproduction time to render all the image frames and/or audio frames associated with the filmed scene 404. The timeline 414 may include a set of second-time intervals 416 which may correspond to dialogue words spoken during conversation between the first person 408 and the second person 410 in the filmed scene 404.

With respect to FIG. 4, it may be assumed that the media content or the text information (such as the text information 118 shown in FIG. 1) may not include the timing information and the speed information (i.e. described for example in FIG. 3A). Thus, the disclosed media rendering device 102 may determine the speed and the first-time interval for the reproduction of the audio representation of the video description information 406. In accordance with an embodiment, the circuitry 202 may be further configured to determine the set of second-time intervals 416 of the filmed scene 404 which may include the audio portion 116 (such as a first audio portion 416A and a second audio portion 416B). Each of the set of second-time intervals 416 may indicate a time interval for reproduction of the audio portion 116 of the filmed scene 404 in the set of filmed scenes. For example, as shown in FIG. 4, the filmed scene 404 may include the first audio portion 416A and the second audio portion 416B, as the audio portion 116 of the filmed scene 404. Each of the first audio portion 416A and the second audio portion 416B may include dialogues words (such as "George: Hey Jack! Where are you heading" and "Jack: I am going to work" shown in FIG. 4) corresponding to the first person 408 and/or the second person 410 captured in the filmed scene 404. The circuitry 202 may be configured to determine the set of second-time intervals 416 in the filmed scene 404 based on audio analysis of each audio frame included in the filmed scene 404. In the audio analysis, the circuitry 202 may compare an audio volume or pitch in each audio frame with an audio threshold (in dB) to determine the set of second-time intervals 416 which may include the dialogue words or music associated with the filmed scene 404.

In an embodiment, the circuitry 202 may be further configured to determine a third-time interval 418 (i.e. time interval from "$t_{o0}$" to "$t_{o1}$" as shown in FIG. 4) of the audio representation of the video description information 406 of the filmed scene 404. The third-time interval 418 may correspond to a duration (for example in certain seconds) required to playback or reproduce the audio representation of the video description information 406 at an actual playback speed of the audio representation of the video description information 406. This time interval may also be the duration for which the text form of the video description information 406 may be displayed on the display device 104 (as shown in FIG. 3B), if the user 120 selects an option to display the video description information 406. The actual playback speed may correspond to a rate or speed (i.e. 1× speed) at which an audio of the media content may be rendered. The actual playback speed may a rate or speed at which the audio portion 116 was recorded at the time of capture of the filmed scene 404. In an embodiment, the third-time interval 418 may be based on a size of the video description information 406. For example, in case of a greater number of words included in the video description information 406 to describe the filmed scene 404, higher may be the duration of the third-time interval 418 to reproduce the audio representation of the video description information 406 at the actual playback speed.

In accordance with an embodiment, the circuitry 202 may be further configured to determine a set of fourth-time intervals 420A-420C of the filmed scene 404. Each of the set of fourth-time intervals 420A-420C may be different from the set of second-time intervals 416 and may include all the intervals that may correspond to natural pauses (or gaps) in the timeline 414 of the filmed scene 404. The set of fourth-time intervals 420A-420C may include a first pause 420A, a second pause 420B, and a third pause 420C, as shown in FIG. 4. The circuitry 202 may be configured to determine the natural pauses or gaps (i.e. corresponding to the set of fourth-time intervals 420A-420C) in the filmed scene 404 based on audio analysis of each audio frame included in the filmed scene 404. In the audio analysis, the circuitry 202 may compare an audio volume or pitch in each audio frame with an audio threshold (in dB). If the audio volume or pitch in the audio frame is less than the audio threshold (say in dB), the corresponding audio frames may be determined as the natural pauses or gaps in the filmed scene 404. The circuitry 202 may be further configured to determine the set of fourth-time intervals 420A-420C or time duration to reproduce the determine pauses or gap such as the first pause 420A, the second pause 420B or the third pause 420C included in the filmed scene 404.

By the way of an example, as shown in FIG. 4, in the timeline 414 associated with the filmed scene 404, from the time $t_0$ to $t_1$, there may be a natural pause which may correspond to the first pause 420A. Between the time $t_1$ to $t_2$, the first person 408 may speak "Hey Jack! Where are you heading?" as the dialogue or the audio portion 116. Further from the time $t_2$ to $t_3$, there may be another natural pause that may correspond to the second pause 420B. At time $t_3$ to $t_4$, the second person 410 may respond to the first person 408 with a dialogue, for example "I am going to work". From time $t_4$ to $t_5$, there may be another natural pause which may correspond to the third pause 420C. Therefore, as shown in FIG. 4, the set of second-time intervals 416 may include the first audio portion 416A that may extend from time $t_1$ to $t_2$ and the second audio portion 416B that may extend from the time $t_3$ to $t_4$. The set of fourth-time intervals 420A-420C may include the first pause 420A that may extend from time $t_0$ to $t_1$, the second pause 420B that may extend from time $t_2$ to $t_3$, and the third pause 420C that may extend from the time $t_4$ to $t_5$.

The circuitry 202 may be further configured to select a first-time interval 422 from the set of fourth-time interval 420A-420C of the filmed scene 404. The first-time interval 422 may be a time interval that may have a duration higher than a duration of a time-interval threshold, and may be further considered as a potential gap for the audio reproduction of the video description information 406 (i.e. scene description). The time-interval threshold may a pre-defined time value (say in milliseconds or few seconds) utilized to filter out minor pauses or gaps that may occur in between while the first person 408 or the second person 410 speaks a particular dialogue. For example, the time-interval threshold may refer to time taken by the first person 408 or the second person 410 to breathe in/out between multiple words of a dialogue.

In an embodiment, the circuitry 202 may select the first-time interval 422 based on the comparison of each of the set of fourth-time intervals 420A-420C with the time-interval threshold. The time-interval threshold may correspond to a value of an interval, in which the audio reproduction of the video description information 406 may not be possible. In other words, the time-interval threshold may correspond to a timing value below which the audio reproduction of the video description information 406 may not provide sufficient details of the scene description to the user 120 to whom the media content is being rendered.

For example, if the duration of the first pause 420A is 0.75 second, the duration of the second pause 420B is 1 second, the duration of the third pause 420C is 0.5 second, and the time-interval threshold is 1 second, then the circuitry 202 may compare the duration of each pause in the set of fourth-time intervals 420A-420C with the time-interval threshold, and may select the first-time interval 422 as the second pause 420B whose duration is greater than or equal to the time-interval threshold. In some embodiments, the circuitry 202 may select the pause (out of the first pause 420A, the second pause 420B, or the third pause 420C) with the longest duration, as the first-time interval 422, because due to longer duration the reproduction speed of the video description information 406 (i.e. scene description) may be same as the actual playback speed and thus, the quality of audio reproduction of the video description information 406 may be maintained.

In accordance with an embodiment, the circuitry 202 may be further configured to determine a reproduction speed to reproduce the audio representation of the video description information 406. The reproduction speed may correspond to the playback speed of the audio representation of the video description information 406. In some embodiments, the circuitry 202 may calculate a multiplication factor and determine the reproduction speed based on the calculated multiplication factor and the actual playback speed of the audio representation of the video description information 406. The multiplication factor may be calculated based on the determined third-time interval 418 and the selected first-time interval 422.

In an example, the duration of the first pause 420A (from time $t_0$ to $t_1$) is 2 seconds, the duration of the second pause 420B (from time $t_2$ to $t_3$) is 3 seconds, and the duration of the third pause 420C (from time $t_4$ to $t_5$) is 2 seconds in the filmed scene 404. In case, the duration of the third-time interval 418 is 5 seconds, such duration may not be sufficient to audibly reproduce the video description information 406 at the actual playback speed during the time intervals corresponding to each of the set of fourth-time intervals 420A-420C (i.e. the first pause 420A, the second pause 420B, and the third pause 420C) or the selected first-time interval 422. The circuitry 202 may be configured to determine the multiplication factor by using equation (1) below:

$$\text{Multiplication Factor} = \frac{\text{Third-time Interval}}{\text{First-time Interval}} \qquad (1)$$

The circuitry 202 may be further configured to determine the reproduction speed to reproduce the audio representation of the video description information 406 based on the calculated multiplication factor and the actual playback speed by using equation (2) below:

$$\text{Reproduction Speed} = \text{Multiplication Factor} * \text{Actual Playback speed} \qquad (2)$$

With reference to the above-mentioned example, by using the equation (1), the circuitry 202 may be configured to determine the multiplication factor to be 1.66 (i.e. ratio of the third-time interval 418 of 5 seconds and the selected first-time interval 422 as the second pause 420B of 3 seconds). In case, the multiplication factor is greater than 1.0 (i.e. the third-time interval 418 is higher than the first-time interval 422), the circuitry 202 may be configured to increase the actual playback speed of the audio representation of the video description information 406 by the multiplication factor. For example, for the multiplication factor of 1.66, the circuitry 202 may determine the reproduction speed as 1.66× of the actual playback speed of the audio representation of the video description information 406 of the filmed scene 404. In other case, when the multiplication factor is less than 1.0 (i.e. the third-time interval 418 is lesser than the first-time interval 422), the circuitry 202 may be configured to decrease the actual playback speed of the audio representation of the video description information 406 by the multiplication factor. For example, for the multiplication factor of 0.8, the circuitry 202 may determine the reproduction speed as 0.8× of the actual playback speed of the audio representation of the video description information 406 of the filmed scene 404. In some embodiments, in case the multiplication factor is less than 1.0, the circuitry 202 may not alter the actual playback speed, and the reproduction speed of the audio representation of the video description information 406 may remain same as the actual playback speed (for example multiplication factor as 0.95 which may be substantially close to 1.0). In some other embodiments, in case the multiplication factor is equal to 1.0 (i.e. the third-time interval 418 is equal to the first-time interval 422), then the circuitry 202 may be configured to determine the reproduction speed as the actual playback speed of the audio representation of the video description information 406.

The circuitry 202 may be further configured to control the reproduction of the audio representation of the video description information 406 at the first-time interval 422 based on the determined reproduction speed. The first-time interval 422 (i.e. one of the pauses) may be different than the set of second-time intervals 416 (i.e. including audio portions of the filmed scene 404). In some embodiments, the first-time interval 422 may be between a first dialogue word (for example the first audio portion 416A) and a second dialogue word (for example, the second audio portion 4168) of the filmed scene 404. For example, as shown in FIG. 4, the audio representation of the video description information 406 (i.e. "George is looking at Jack while Jack is driving the car" as the scene description) may be reproduced at the first-time interval 422 at the determined reproduction speed (for example 1.66× in case the third-time interval 418 is 5 seconds and the first-time interval 422 is 3 seconds). Thus, the circuitry 202 may increase the audio reproduction speed of the video description information 406 (i.e. scene description) between the audio dialogue gaps (i.e. the first-time interval 422), without any reduction or deletion in a portion (for example certain characters, text, or words) of the video description information 406. The increase in the speed may effectively incorporate or fit the audio representation of the video description information 406 within the first-time interval 422, duration of which may be lesser than the third-time interval 418 of the video description information 406. Therefore, the quality of reproduction of the video description information 406 is maintained even the determined gap (i.e. first-time interval 422 of a particular gap in the filmed scene 404) may be short than the third-time interval 418 (i.e. time required to audibly reproduce the scene/video description).

In certain embodiments, the first dialogue word may be a last word of the first shot of the filmed scene 404 and the second dialogue word may be a first word of the second shot of the filmed scene 404. The first shot and the second shot may be consecutive shots of the filmed scene 404. In some other embodiments, the first-time interval 422 may be between a start of the filmed scene 404 and the first dialogue word (such as the first audio portion 416A) of the filmed scene 404. In such case, the first-time interval 422 may correspond to the first pause 420A as shown in FIG. 4.

It may be noted that the filmed scene 404 and the plurality of animated or in-animated objects shown in FIG. 4 is presented merely as an example. The present disclosure may be also applicable to other types of filmed scenes (for example, but not limited to, an action scene, a romantic scene, a drama scene, a dance scene, or a musical scene) and the plurality of animated or in-animated objects. A description of other types or examples of filmed scene 404 and the plurality of animated or in-animated objects has been omitted from the disclosure for the sake of brevity.

In an embodiment, the circuitry 202 may be configured to determine the set of second-time intervals for each of the set of filmed scenes 114, where each of the set of second-time intervals may indicate a time interval for reproduction of an audio portion of the corresponding filmed scene. The circuitry 202 may be further configured to determine a third-time interval of an audio representation of the video description information of the corresponding filmed scene of the set of filmed scenes 114. The circuitry 202 may be further configured to determine a speed to reproduce the audio representation of the video description information 406 based on the determined set of second-time intervals and the determined third-time interval for each scene as described above with respect to the filmed scene 404. The circuitry 202 may be further configured to control, based on the determined speed, the reproduction of the audio representation of the video description information at a first-time interval (i.e. which is different than the set of second-time intervals) for each of the filmed scene of the set of filmed scenes 114. Thus, the disclosed media rendering device 402 may process each filmed scene in the media content, select the first-time interval 422 in the corresponding filmed scene, and determine the reproduction speed of the video description information 406 associated with the filmed scene, during the playback of the corresponding filmed scene or previous filmed scene (i.e. scene just before the corresponding filmed scene). The media rendering device 402 may be further able to dynamically control the reproduction of the audio representation of the corresponding video description information (i.e. scene description) based on the determined reproduction speed for each filmed scene in the set of filmed scenes 114. Therefore, the disclosed media rendering device 402 may enhance content experience of the user 120, for example a visually impaired or cognitively impaired user.

In an embodiment, the circuitry 202 may be further configured to receive a first user input, via the I/O device 206 from the user 120. The first user input may be in a textual format and may correspond to the video description information 406 or a scene description of one of the set of filmed scenes 114. The circuitry 202 may receive the first user input during the playback of the media content or before the start of playback of the media content. The first user input may be a textual word or phrase which may be included in the video description information 406 of one of the set of filmed scenes 114. For example, the video description information 406, shown in FIG. 4, may be "George is looking at Jack while Jack is driving the car". The received first user input may include a word or phrase (for example "George is looking at Jack") which may be a part of the video description information 406.

The circuitry 202 may be further configured to search the received first user input in the stored video description information 406 associated with each of the set of the filmed scenes 114. In some embodiments, the text description received in the first user input may be exactly same as the video description information 406 of one of the set of filmed scenes 114. In other embodiments, the first user input may be a portion of the video description information 406. The circuitry 202 may be further configured to determine playback timing information to playback the media content based on the search. To determine the playback timing information based on the search, the circuitry 202 may determine a filmed scene (for example the filmed scene 404) and corresponding video description information 406, which includes the first user input. In such case, the playback timing information may be playback timing of the determined filmed scene. In some other embodiment, the text description received in the first user input may not be exactly same as the video description information 406 associated with each of the set of filmed scenes 114. In such scenario, the circuitry 202 may be configured to determine a similarity score between the text description received in the first user input and the video description information 406 associated with each of the set of filmed scenes 114. The similarity score may be determined based on a match of the text description with the portion of the video description information 406 of the corresponding filmed scene. In some embodiments, the similarity score may be calculated based on a popularity score associated with each of the set of filmed scenes 114 of the media content. The circuitry 202 may retrieve the popularity score of each filmed scene from the server 108. In an embodiment, the popularity score of each filmed scene may be included in the media content retrieved from the server 108 or the memory 204. For example, the first user input (i.e. description) is a word "George is looking at Jack" which may be in the video description information 406 associated with multiple filmed scenes including the filmed scene 404. In such case, the circuitry 202 may extract the popularity score of each filmed scene among the multiple filmed scenes, to identify which scene is more popular among people and may have higher probability (say the filmed scene 404) that the user 120 would like to search the description in the video description information 406 of the higher popular filmed scene. The circuitry 202 may be further configured to determine the playback timing information of the identified filmed scene (for example the filmed scene 404) with which the similarity score of the received description (or the first user input) may be high. The circuitry 202 may be further configured to control the playback of the media content from the identified filmed scene based on the determined playback timing information ($t_0$). Thus, the disclosed media rendering device 402 may allow the user 120 to search a word or text in the stored video description information 406 (i.e. scene description) of each of the set of filmed scenes 114 of the media content, and may accordingly control (i.e. forward or rewind) the playback timing of the identified filmed scene, which may be identified based on the search. Therefore, the media rendering device 402 may provide a functionality of a search engine, where the user 120 may search the description corresponding to one or more scenes in the media content.

In an embodiment, the media rendering device 402 may be further configured to provide personalized recommendations of new media content based on the previous search descriptions received in the first user input in a certain duration (for example in last one day or a week). By way of an example, if the user 120 frequently search "action" word in a particular duration, the circuitry 202 may provide recommendation of other or new media content which may be related to "action" genre. Therefore, the disclosed media rendering device 402 may recommend media content related to scene or video descriptions which the user 120 may search frequently.

In an embodiment, the media rendering device 402 may be configured to store a first defined speed setting, associated with the media rendering device 402, in the memory 204. The first defined speed setting may indicate a maximum speed to reproduce the audio representation of the video description information 406 (i.e. scene description). The maximum speed, indicated by the first defined speed setting, may be a speed at which the audio representation of the video description information 406 may be correctly understood by the user 120 to whom the media content is being rendered. For example, the maximum speed may be 2× of the actual playback speed. In some embodiments, the first defined speed setting may indicate a maximum value of the multiplication factor (for example 2.0) based on which the reproduction speed may be determined.

In another embodiment, the media rendering device 402 may be configured to store a second defined speed setting associated with the media rendering device 402 in the memory 204. The second defined speed setting may indicate a minimum speed to reproduce the audio representation of the video description information 406 (i.e. scene description). The minimum speed, indicated by the second defined speed setting, may be a speed at which the audio representation of the video description information 406 may be correctly understood by the user 120 to whom the media content is being rendered. For example, the minimum speed may be 0.5× of the actual playback speed. In some embodiments, the second speed defined setting may indicate a minimum value of the multiplication factor (for example 0.5) based on which the reproduction speed may be determined.

In accordance with an embodiment, the circuitry 202 may be further configured to control playback of one of the image portion or the audio portion of the filmed scene 404 based on the determined reproduction speed of the audio representation of the video description information 406, and the first/second defined speed setting. The playback control of one of the image portion or the audio portion (i.e. dialogues) of the filmed scene 404 may correspond to time delay or pause for the render of the image portion and/or the audio portion of the filmed scene, in case the natural pause (i.e. first-time interval 422) may be long enough to accommodate the audio representation of the video description information 406 based on the determined reproduction speed and the first or second defined speed setting.

By the way of an example, if the first defined speed setting (i.e. maximum speed) is 2× of the actual playback speed of the audio representation of the video description information 406, the third-time interval 418 is of 7 seconds, and the duration of the first-time interval 422 is 3 seconds, then the determined reproduction speed by 2.33× as per equation (1). As the determined reproduction speed is higher than the maximum speed (i.e. 2×), the circuitry 202 may discard the first-time interval 422 selected from the set of fourth-time intervals 420A-420C. In such case, the circuitry 202 may pause the image portions or the audio portions (i.e. dialogues such as the second audio portion 416B in FIG. 4) of the filmed scene 404 to render the audio representation of the video description information 406. In another case, the circuitry 202 may audibly render the video description information 406 at the maximum speed (like 2×) and pause the image portions or the audio portions of the filmed scene for remaining time (such as remaining 1 second in case the third-time interval 418 is of 7 seconds, and the duration of the first-time interval 422 is 3 seconds) to maintain quality of the media content being rendered.

In an embodiment, the circuitry 202 may be further configured to receive a second user input from the user 120, via the I/O device 206. The second user input may indicate profile information of the user 120 to whom the media content may be rendered. The profile information may include past speed preferences of the user 120 to audibly render the video description information 406. In some embodiments, the profile information may indicate a unique identification number (for example, but not limited to, a social security number (SSN), a phone number, or an insurance policy number) that may be associated with the user 120. The circuitry 202 may be further configured to retrieve an age of the user 120 from the server 108 or the memory 204 based on the received unique identification number. In some embodiments, the circuitry 202 may be further configured to determine a health status of the user 120, based on the unique identification number associated with the user 120. The health status may indicate a listening inability of the user 120 to understand the audio representation of the video description information 406 or the audio portions (i.e. dialogues) of the filmed scene at a particular reproduction speed. The circuitry 202 may be further configured to determine the reproduction speed to reproduce the audio representation of the video description information 406 based on the received second user input.

By the way of an example, if the age of the user 120 is determined as 65 years (i.e. old age), then the circuitry 202 may determine reproduction speed as 1.5× of the actual playback speed of the audio representation of the video description information 406. In some embodiments, the circuitry 202 may define the first speed setting (for example as 1.5× as maximum speed) based on the determined age. By the way of another example, if the health status of the user 120 indicate that the user 120 had a surgery in the ear in last predefined duration (say in last six month), the circuitry 202 may define the first speed setting or determine the reproduction speed as 1.2× of the actual playback speed of the audio representation of the video description information 406. Therefore, the disclosed media rendering device 402 may control the reproduction speed or the speed setting (for example maximum or minimum) for reproduction of the scene/video description based on the profile information (such as age or health status) of the user 120, so that the reproduction quality of the audio scene description is maintained for different users which may have either or both of the visual or hearing impairments problems.

In an embodiment, a trained machine learning (ML) model 212 (shown in FIG. 2) may be stored in the memory 204 of the media rendering device 402. The trained ML model 212 may determine or output an audio characteristic to reproduce the audio representation of the video description information 406 based on context information (i.e. indicate context) of the filmed scene 404. The context information may be an input to the trained machine learning (ML) model 212. The machine learning (ML) model 212 may be trained to identify a relationship between the input (i.e. context information) and the output (i.e. audio characteristics). The ML model 212 may be defined by its hyper-parameters, for example, number of weights, cost function, input size, number of layers, and the like. The hyper-parameters of the ML model 212 may be tuned and weights may be updated so as to move towards a global minima of a cost function for the ML model 212. After several epochs of the training on features in a training dataset of the ML model 212, the ML model 212 may be trained to output a prediction result (for example the audio characteristics) for a set of inputs (i.e. context information).

The ML model 212 may include electronic data, such as, for example, a software program, code of the software program, libraries, applications, scripts, or other logic or instructions for execution by a processing device, such as the circuitry 202. The ML model 212 may include code and routines configured to enable a computing device, such as the media rendering device 402 to perform one or more operations for determination of the audio characteristic based on the context information. Additionally, or alternatively, the ML model 212 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 212 may be implemented using a combination of hardware and software.

In accordance with the embodiment, the circuitry 202 may be configured to determine the context information of the filmed scene 404. Examples of the context information may include, but are not limited to, action, fight, adventure, animation, comedy, dance, musical, crime, epic, erotica, fantasy, horror, mystery, philosophical, political, religion, romance, science fiction, thriller, urban, war, biography, or tragedy. The context information may be determined based on analysis of at least one visual characteristics of the filmed scene 404. The visual characteristics of the filmed scene 404 may include, but are not limited to, an object (say as the car 412 in FIG. 4) recognized in at least one frame, a person (such as the first person 408 or the second person 410 in FIG. 4) recognized in the at least one frame, an emotional state of at least one object in the at least one frame (such as a happy state, a sad state, an angry state, a confused state, a stressed state, or an excited state), background information of the at least one frame, an ambient lighting condition in the at least one frame, motion information (i.e. static or moving) of at least one object in the at least one frame, a gesture associated with at least one object in the at least one frame (such as dance gesture or action gesture), or genre information associated with the at least one frame. In some embodiments, the circuitry 202 may be configured to implement various image processing, scene mining, or scene understanding methods known in the art to determine the visual characteristics and the context information of the filmed scene (such as the filmed scene 404).

The circuitry 202 may be further configured to determine the audio characteristics to reproduce the audio representation of the video description information 406 based on the application of the trained ML model 212 on the determined context of the filmed scene 404. The audio characteristics may include, but not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters. The audio characteristics may be determined based on the application of the trained ML model 212 on the determined context information of the filmed scene 404.

The circuitry 202 may be further configured to control the reproduction of the audio representation of the video description information 406 at the first-time interval 422 based on the determined speed and the determined audio characteristics. By the way an example, if the context information of the filmed scene 404 is determined as a fight scene, the circuitry 202 may be configured to increase the loudness parameters (such a volume), and the intensity of overtones parameter (i.e. audio characteristics) of the video description information 406 to provide a realistic user experience to the user 120 to whom the media content and the video description information 406 (i.e. scene description) may be being rendered. In such case, based on the determination of the context information as the fight scene, the circuitry 202 may determine the loudness parameters (such a volume) as the audio characteristics based on the application of the trained ML model 212 on the determined context information.

In another embodiment, the circuitry 202 may be further configured to control the audio rendering device 106 to audibly reproduce the audio representation of the video description information 406 and the audio portion (such as the first audio portion 416A and the second audio portion 416B) of the filmed scene 404 or each filmed scene of the set of filmed scenes. The audio rendering device 106 may be associated with or integrated inside the media rendering device 402 (as shown in FIG. 2).

In an embodiment, the video description information 406 of the filmed scene 404 may include cognitive information about an animated and/or in-animated objects present in the filmed scene 404. The animated object may include a living object (such as human, animals, or birds). The in-animated object may include a non-living object. The cognitive information about an object (animated or in-animated) may provide in-depth details of the object that may or may not be relevant to the context to the filmed scene 404. The cognitive information may provide general knowledge or information to the user 120 about the object present in the filmed scene 404. In some embodiments, the cognitive information may correspond to an image or an icon associated with the object, or may correspond to an audio tone associated with the object present in the filmed scene. In an embodiment, the circuitry 202 may be further configured to control the playback of the cognitive information either by the display device 104 or the audio rendering device 106.

Figure 5:
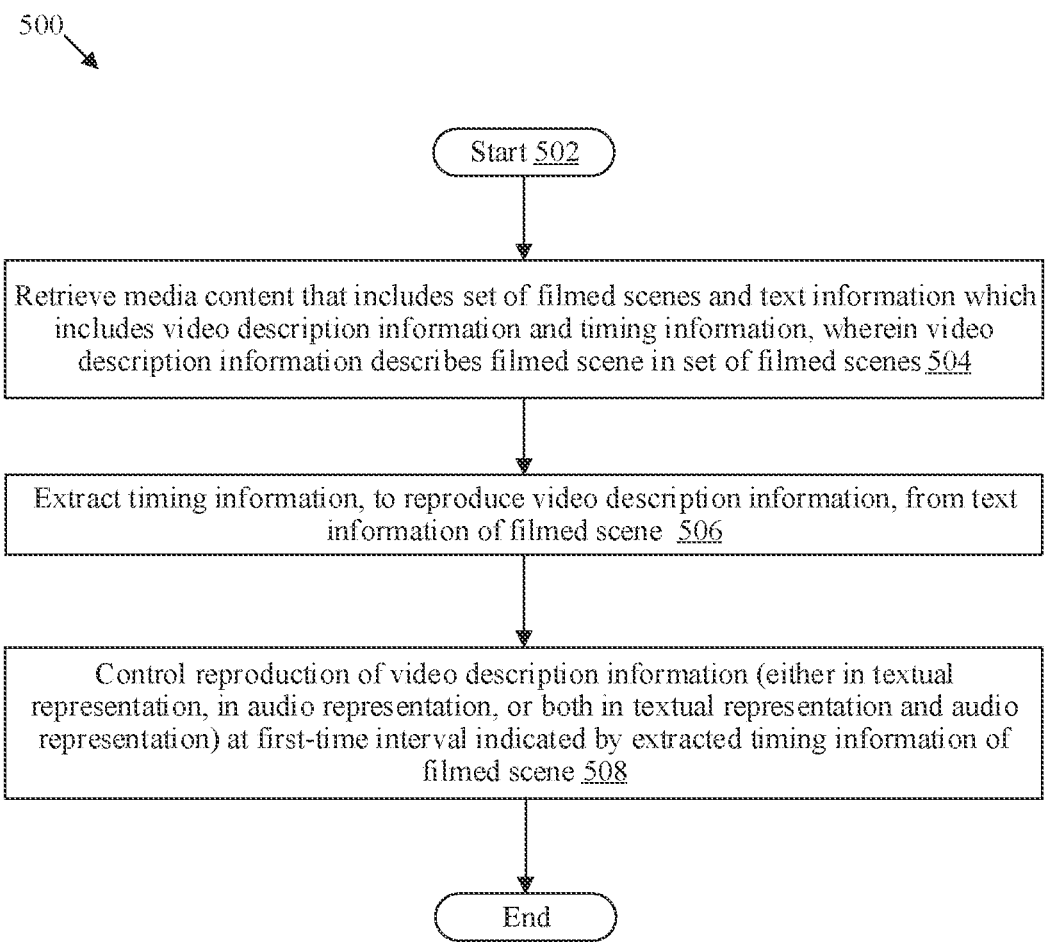
FIG. 5 is a first flowchart that illustrates exemplary operations for reproduction control of scene description, in accordance with an embodiment of the disclosure.

FIG. 5 is a first flowchart that illustrates exemplary operations for reproduction control of scene description, in accordance with an embodiment of the disclosure. FIG. 5 is explained in conjunction with elements from FIGS. 1, 2, 3A, 3B, and 4. With reference to FIG. 5, there is shown a flowchart 500. The operations from 502 to 508 may be implemented on any computing device, for example, the media rendering device 102 or the circuitry 202. The operations may start at 502 and proceed to 504.

At 504, the media content may be retrieved. The media content may include the set of filmed scenes 114 and the text information 118. The text information 118 may include the video description information 118A and the timing information 118B. The video description information 118A may describe a filmed scene in the set of filmed scenes 114. In one or more embodiments, the circuitry 202 may be configured to the retrieve media content 112 that may include the set of filmed scenes 114 and the text information 118. The text information 118 may further include the video description information 118A and the timing information 118B. The video description information 118A may describe the filmed scene in the set of filmed scenes 114.

At 506, the timing information 118B may be extracted, to reproduce the video description information 118A, from the text information 118 of the filmed scene. In one or more embodiments, the circuitry 202 may be configured to extract the timing information 118B (i.e. to reproduce the video description information 118A) from the text information 118 of the filmed scene.

At 508, the reproduction of the video description information 118A (either in the textual representation, in the audio representation, or both in the textual representation and the audio representation) may be controlled. The video description information 118A may be reproduced at a first-time interval indicated by the extracted timing information 118B of the filmed scene. In one or more embodiments, the circuitry 202 may be configured to control the reproduction of the video description information 118A (either in the textual representation, in the audio representation, or both in the textual representation and the audio representation) at the first-time interval indicated by the extracted timing information of the filmed scene. Control may pass to end.

Figure 6:
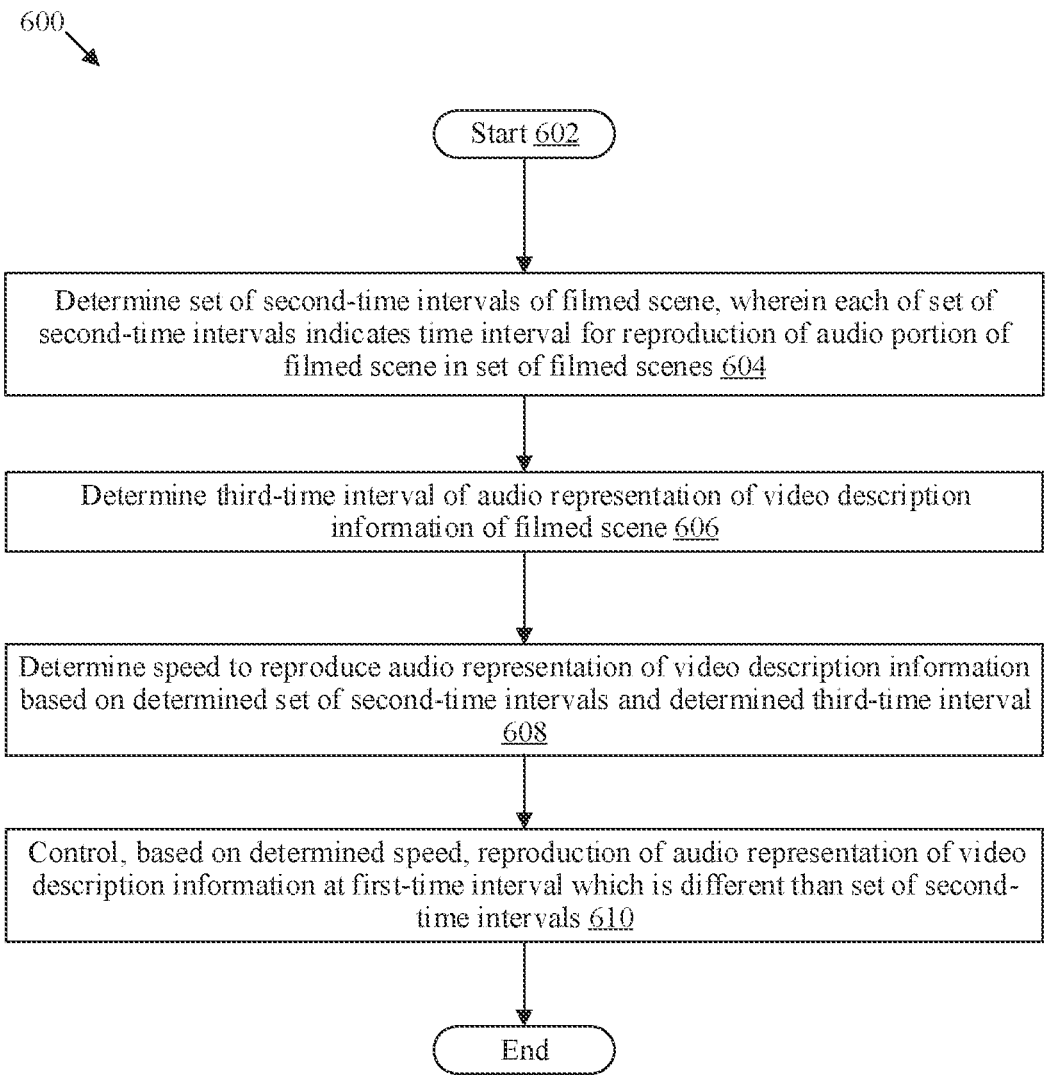
FIG. 6 is a second flowchart that illustrates exemplary operations for reproduction control of scene description, in accordance with an embodiment of the disclosure.

FIG. 6 is a second flowchart that illustrates exemplary operations for reproduction control of scene description, in accordance with an embodiment of the disclosure. FIG. 6 is explained in conjunction with elements from FIGS. 1, 2, 3A, 3B, 4, and 5. With reference to FIG. 6, there is shown a flowchart 600. The operations from 602 to 610 may be implemented on any computing device, for example, the media rendering device 102 or the circuitry 202. The operations may start at 602 and proceed to 604.

At 604, a set of second-time intervals of the first filmed scene 114A may be determined. Each of the set of second-time intervals may indicate a time interval for reproduction of an audio portion 116 of the filmed scene in the set of filmed scenes 114. In one or more embodiments, the circuitry 202 may be configured to determine the set of second-time intervals of the filmed scene, where each of the set of second-time intervals may indicate the time interval for reproduction of the audio portion 116 of the filmed scene in the set of filmed scenes 114. Details of the determination of the set of second-time intervals are described, for example, in FIG. 4.

At 606, a third-time interval of an audio representation of the video description information 118A of the filmed scene may be determined. In one or more embodiments, the circuitry 202 may be configured to determine the third-time interval of the audio representation of the video description information 118A of the filmed scene. Details of the determination of the third-time interval are described, for example, in FIG. 4.

At 608, a speed to reproduce the audio representation of the video description information 118A may be determined based on the determined set of second-time intervals and the determined third-time interval. In one or more embodiments, the circuitry 202 may be configured to determine the speed to reproduce the audio representation of the video description information 118A (i.e. scene description) based on the determined set of second-time intervals and the determined third-time interval. Details for determination of the reproduction speed of the video description information are described, for example, in FIG. 4.

At 610, reproduction of the audio representation of the video description information 118A may be controlled based on the determined speed. The audio representation of the video description information 118A may be reproduced at the first-time interval that may be different from the set of second-time intervals. In one or more embodiments, the circuitry 202 may be configured to control the reproduction of the audio representation of the video description information 118A at the first-time interval based on the determined speed. Details to control the reproduction of the audio representation of the video description information 118A are described, for example, in FIG. 4. Control may pass to end.

Various embodiments of the disclosure may provide a non-transitory computer readable medium and/or storage medium having stored thereon, instructions executable by a machine and/or a computer such as the media rendering device 402. The instructions may cause the machine and/or computer to perform operations that may include retrieval of media content that may include a set of filmed scenes. The media content may also include text information that may further include video description information, and timing information. The video description information may describe a filmed scene in the set of filmed scenes. The operations may further include extraction of the timing information to reproduce the video description information from the text information of the filmed scene. The operations may further include control of the reproduction of the video description information either in a textual representation or the textual representation and audio representation at a first-time interval indicated by the extracted timing information of the filmed scene.

In some other embodiment, the operations may include determination of a set of second-time intervals of the filmed scene. Each of the set of second-time intervals may indicate a time interval for reproduction of an audio portion of the filmed scene in the set of filmed scenes. The operations may further include determination of a third-time interval of an audio representation of the video description information of the filmed scene. The operations may further include determination of a speed to reproduce the audio representation of the video description information based on the determined set of second-time intervals and the determined third-time interval. The operations may further include control of the reproduction of the audio representation of the video description information based on the determined speed at the first-time interval. The first-time interval may be different than the set of second-time intervals.

Exemplary aspects of the disclosure may include a media rendering device (such as the media rendering device 102 of FIG. 1) that may include circuitry (such as the circuitry 202). The circuitry may be configured to retrieve media content that may include a set of filmed scenes (such as the set of filmed scenes 114), an audio portion (such as the audio portion 116), and text information (such as the text information 118). The text information may include textually-based video description information (such as the video description information 118A), and timing information (such as the timing information 118B). The video description information 118A may describe a filmed scene (such as the filmed scene 304) in the set of filmed scenes. The media content may further include closed caption information that may represent the audio portion of each of the set of filmed scenes. The video description information that describes each of the set of filmed scenes may be encoded with the closed caption information in the media content. In an embodiment, the circuitry may be further configured to convert the text information of the filmed scene into the audio representation of the video description information.

In an embodiment, the circuitry may be further configured to extract the timing information to reproduce the video description information from the text information of the filmed scene. The circuitry may be further configured to control the reproduction of the video description information in either a textual representation or in a textual and audio representation at a first-time interval indicated by the extracted timing information of the filmed scene.

In another embodiment, the circuitry may be further configured to extract the speed information to reproduce the video description information from the text information of the filmed scene. The text information may further include the speed information. The circuitry may be further configured to control the reproduction of the audio representation of the video description information at a first-time interval indicated by the extracted timing information of the filmed scene based on the extracted speed information.

In some embodiments, the circuitry may be configured to determine a set of second-time intervals (such as the set of second-time intervals 416) of the filmed scene. Each of the set of second-time intervals may indicate a time interval for reproduction of the audio portion of the filmed scene in the set of filmed scenes. The circuitry may be further configured to determine a third-time interval (such as the third-time interval 418) of an audio representation of the video description information of the filmed scene. The circuitry may be further configured to determine a speed to reproduce the audio representation of the video description information. The speed to reproduce the audio representation of the video description information may be determined based on the determined set of second-time intervals and the determined third-time interval. In an embodiment, the determined speed may be lower than an actual playback speed of the converted audio representation. In another embodiment, the determined speed may be higher than an actual playback speed of the converted audio representation.

In some embodiments, the circuitry may be configured to control the reproduction of the audio representation of the video description information at the first-time interval (such as the first-time interval 422). The reproduction of the audio representation of the video description information may be controlled based on the determined speed. In an embodiment, the circuitry may be configured to determine a set of fourth-time intervals (such as the set of fourth-time intervals 420A-420C) of the filmed scene. Each of the set of fourth-time intervals may be different than the set of second-time intervals. The circuitry may be configured to select the first-time interval from the set of fourth-time intervals where the first-time interval may be higher than a time-interval threshold. The first-time interval may be different than the set of second-time intervals. In an embodiment, the first-time interval may be between a first dialogue word and a second dialogue word of the filmed scene. The first dialogue word may be a last word of a first shot of the filmed scene and the second dialogue word may be a first word of a second shot of the filmed scene. The first shot and the second shot may be consecutive shots of the filmed scene. In another embodiment, the first-time interval may be between a start of the filmed scene and a first dialogue word of the filmed scene.

In some embodiments, the circuitry may be configured to determine the speed to reproduce the audio representation of the video description information based on a defined speed setting associated with the media rendering device. The defined speed setting may indicate a maximum speed to reproduce the audio representation of the video description information. The circuitry may be further configured to receive speed information with the text information and control playback of one of an image portion or the audio portion of the filmed scene based on the determined speed and the defined speed setting. In some embodiments, the video description information that describes the filmed scene may include cognitive information about animated or in-animated objects present in the filmed scene. The circuitry may be configured to control playback of the cognitive information included in the video description information of the filmed scene.

In an embodiment, the circuitry may be configured to receive a first user input that may correspond to a description of one of the set of filmed scenes. The circuitry may be further configured to search the received first user input in the video description information associated with each of the set of filmed scenes. The circuitry may be further configured to determine playback timing information to playback the media content based on the search. The circuitry may be further configured to control the playback of the media content based on the determined playback timing information.

In another embodiment, the circuitry may be configured to receive a second user input that may indicate profile information of a user to whom the media content may be rendered. The circuitry may be configured to determine the speed setting to reproduce the audio representation of the video description information based on the received second user input.

In some embodiments, a memory (such as the memory 204) associated with the media rendering device may be configured to store a trained machine learning (ML) model (such as the trained ML model 212). The circuitry may be configured determine context information of the filmed scene based on an analysis of at least one characteristics of the filmed scene. The circuitry may be further configured to determine an audio characteristic to reproduce the audio representation of the video description information based on an application of the trained ML model on the determined context information of the filmed scene. The circuitry may be further configured to control the reproduction of the audio representation of the video description information at the first-time interval based on the determined speed and the determined audio characteristics.

In an embodiment, the media rendering device may include a display device configured to reproduce (or display) the textual representation of the video description information. In another embodiment, the textual representation may be displayed in addition to the reproduction of the audio representation of the video description information.

In another embodiment, the circuitry may be further configured to control an audio rendering device. The audio rendering device may be associated with the media rendering device. The audio rendering device may be controlled to reproduce the audio representation of the video description information and the audio portion of the filmed scene.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A media rendering device, comprising:
a memory configured to store a trained machine learning (ML) model; and
circuitry configured to:
retrieve media content that comprises a set of filmed scenes and text information which includes video description information, speed information, and timing information, wherein
the video description information describes a filmed scene in the set of filmed scenes;
extract the timing information, to reproduce the video description information, from the text information of the filmed scene;
extract a first-time interval from the timing information, wherein
the first-time interval corresponds to a natural pause between consecutive audio portions of the filmed scene;
determine a set of second-time intervals of the filmed scene, wherein
each of the set of second-time intervals indicates a time interval for reproduction of an audio portion of the filmed scene in the set of filmed scenes;
determine a third-time interval which indicates a time duration required to reproduce an audio representation of the video description information of the filmed scene;
determine a multiplication factor based on a ratio of the determined third-time interval and the first-time interval;
determine a speed to reproduce the audio representation of the video description information based on the multiplication factor and an actual playback speed of the audio representation of the video description information; wherein the speed information indicates the speed for the reproduction of the audio representation of the video description information;
determine context information of the filmed scene based on an analysis of at least one characteristic of the filmed scene;
determine an audio characteristic to reproduce the audio representation of the video description information based on an application of the trained ML model on the determined context information of the filmed scene; and
control the reproduction of the audio representation of the video description information at the first-time interval indicated by the extracted timing information of the filmed scene, based on the speed information and the determined audio characteristic.

2. The media rendering device according to claim 1, wherein
the circuitry is further configured to:
extract the speed information, to reproduce the video description information, from the text information of the filmed scene; and
control, based on the extracted speed information, the reproduction of the audio representation of the video description information at the first-time interval indicated by the extracted timing information of the filmed scene.

3. The media rendering device according to claim 1, wherein the circuitry is further configured to:
determine a set of fourth-time intervals of the filmed scene, wherein each of the set of fourth-time intervals is different than the set of second-time intervals; and select the first-time interval from the set of fourth-time intervals, wherein the first-time interval is higher than a time-interval threshold.

4. The media rendering device according to claim 1, wherein the determined speed is lower than the actual playback speed of the audio representation.

5. The media rendering device according to claim 1, wherein the determined speed is higher than the actual playback speed of the audio representation.

6. The media rendering device according to claim 1, wherein
the circuitry is further configured to determine the speed to reproduce the audio representation of the video description information based on a defined speed setting associated with the media rendering device, and
the defined speed setting indicates a maximum speed to reproduce the audio representation of the video description information.

7. The media rendering device according to claim 6, wherein the circuitry is further configured to:
receive the speed information with the text information; and
control playback of one of an image portion or the audio portion of the filmed scene based on the determined speed and the defined speed setting.

8. The media rendering device according to claim 6, wherein the circuitry is further configured to:
receive a first user input which indicates profile information of a user to whom the media content is being rendered; and
determine the defined speed setting to reproduce the audio representation of the video description information based on the received first user input.

9. The media rendering device according to claim 1, wherein the circuitry is further configured to:
receive a first user input which corresponds to a description of one of the set of filmed scenes;
search the received first user input in the video description information associated with each of the set of filmed scenes;
determine playback timing information to playback the media content based on the search; and
control the playback of the media content based on the determined playback timing information.

10. The media rendering device according to claim 1, wherein the first-time interval is between a first dialogue word and a second dialogue word of the filmed scene.

11. The media rendering device according to claim 10, wherein
the first dialogue word is a last word of a first shot of the filmed scene and the second dialogue word is a first word of a second shot of the filmed scene, and
the first shot and the second shot are consecutive shots of the filmed scene.

12. The media rendering device according to claim 1, wherein
the video description information, that describes the filmed scene, includes cognitive information about animated or in-animated objects present in the filmed scene, and
the circuitry is further configured to control playback of the cognitive information included in the video description information of the filmed scene.

13. The media rendering device according to claim 1, further comprising a display device configured to reproduce a textual representation of the video description information.

14. The media rendering device according to claim 1, wherein
the media content further comprises closed caption information to represent the audio portion of each of the set of filmed scenes, and
the video description information which describes each of the set of filmed scenes is encoded with the closed caption information in the media content.

15. The media rendering device according to claim 1, wherein the circuitry is further configured to control an audio rendering device, associated with the media rendering device, to reproduce the audio representation of the video description information and the audio portion of the filmed scene.

16. A method, comprising:
in a media rendering device:
storing a trained machine learning (ML) model in a memory;
retrieving media content that comprises a set of filmed scenes and text information which includes video description information, speed information, and timing information, wherein the video description information describes a filmed scene in the set of filmed scenes;
extracting the timing information to reproduce the video description information, from the text information of the filmed scene;
extracting a first-time interval from the timing information, wherein
the first-time interval corresponds to a natural pause between consecutive audio portions of the filmed scene;
determining a set of second-time intervals of the filmed scene, wherein
each of the set of second-time intervals indicates a time interval for reproduction of an audio portion of the filmed scene in the set of filmed scenes;
determining a third-time interval which indicates a time duration required to reproduce an audio representation of the video description information of the filmed scene;
determining a multiplication factor based on a ratio of the determined third-time interval and the first-time interval;
determining a speed to reproduce the audio representation of the video description information based on the multiplication factor and an actual playback speed of the audio representation of the video description information; wherein the speed information indicates the speed for the reproduction of the audio representation of the video description information;
determining context information of the filmed scene based on an analysis of at least one characteristic of the filmed scene;
determining an audio characteristic to reproduce the audio representation of the video description information based on an application of the trained ML model on the determined context information of the filmed scene; and
controlling the reproduction of the audio representation of the video description information at the first-time interval indicated by the extracted timing information of the filmed scene, based on the speed information and the determined audio characteristic.

17. The method according to claim 16, further comprising:
- extracting the speed information, to reproduce the video description information, from the text information of the filmed scene; and
- controlling, based on the extracted speed information, the reproduction of the audio representation of the video description information at the first-time interval indicated by the extracted timing information of the filmed scene.

18. A non-transitory computer-readable medium having stored thereon, computer-executable instructions that when executed by a media rendering device, causes the media rendering device to execute operations, the operations comprising:
- storing a trained machine learning (ML) model in a memory;
- retrieving media content that comprises a set of filmed scenes and text information which includes video description information, speed information, and timing information, wherein the video description information describes a filmed scene in the set of filmed scenes;
- extracting the timing information to reproduce the video description information, from the text information of the filmed scene;
- extracting a first-time interval from the timing information, wherein
  - the first-time interval corresponds to a natural pause between consecutive audio portions of the filmed scene;
- determining a set of second-time intervals of the filmed scene, wherein
  - each of the set of second-time intervals indicates a time interval for reproduction of an audio portion of the filmed scene in the set of filmed scenes;
- determining a third-time interval which indicates a time duration required to reproduce an audio representation of the video description information of the filmed scene;
- determining a multiplication factor based on a ratio of the determined third-time interval and the first-time interval;
- determining a speed to reproduce the audio representation of the video description information based on the multiplication factor and an actual playback speed of the audio representation of the video description information, wherein the speed information indicates the speed for the reproduction of the audio representation of the video description information;
- determining context information of the filmed scene based on an analysis of at least one characteristic of the filmed scene;
- determining an audio characteristic to reproduce the audio representation of the video description information based on an application of the trained ML model on the determined context information of the filmed scene; and
- controlling the reproduction of the audio representation of the video description information at the first-time interval indicated by the extracted timing information of the filmed scene, based on the speed information and the determined audio characteristic.

* * * * *